(12) United States Patent
Robinson

(10) Patent No.: US 11,377,214 B2
(45) Date of Patent: *Jul. 5, 2022

(54) PASSENGER SEATING WITH MULTI-MODE PRIVACY DOOR

(71) Applicant: Thompson Aero Seating Limited, Portadown (GB)

(72) Inventor: Aaron Robinson, Lurgan (GB)

(73) Assignee: Thompson Aero Seating Limited

( * ) Notice: Subject to any disclaimer, the term of this patent is extended or adjusted under 35 U.S.C. 154(b) by 0 days.

This patent is subject to a terminal disclaimer.

(21) Appl. No.: 17/077,379

(22) Filed: Oct. 22, 2020

(65) Prior Publication Data
US 2021/0039790 A1 Feb. 11, 2021

Related U.S. Application Data

(63) Continuation of application No. 15/474,131, filed on Mar. 30, 2017, now Pat. No. 11,084,587.

(30) Foreign Application Priority Data

Apr. 1, 2016 (GB) ..................................... 1605539

(51) Int. Cl.
*B64D 11/06* (2006.01)
*E05D 15/58* (2006.01)
(Continued)

(52) U.S. Cl.
CPC ........ *B64D 11/0606* (2014.12); *B64C 1/1423* (2013.01); *B64D 11/0023* (2013.01);
(Continued)

(58) Field of Classification Search
CPC ...... E06B 3/5072; E06B 3/509; E06B 3/5054; E06B 3/50; B05Y 2900/502;
(Continued)

(56) References Cited

U.S. PATENT DOCUMENTS

2004/0173327 A1* 9/2004 Steel .................. E06B 3/50
160/210
2006/0145007 A1 7/2006 Melberg et al.
(Continued)

FOREIGN PATENT DOCUMENTS

EP 2578788 A1 4/2013
WO 2005080196 A1 9/2005
(Continued)

OTHER PUBLICATIONS

European Search Report for co-pending U.S. Appl. No. 19/152,621, completed Mar. 29, 2019.

*Primary Examiner* — Mark R Wendell
(74) *Attorney, Agent, or Firm* — Warner Norcross + Judd LLP

(57) ABSTRACT

Passenger seating comprises rows of seats with a door assembly at the end of each row for improving a seat occupant's privacy. The door assembly includes a door that slides into and out of a base in a primary mode of operation, and which supports a secondary mode of opening. The secondary mode may involve pivoting on hinges. A latch is provided to prevent the door from being opened routinely in the secondary mode. The door assembly is also capable of retracting with respect to the adjacent seat to improve access.

20 Claims, 22 Drawing Sheets

(51) Int. Cl.
*B64D 11/00* (2006.01)
*E06B 3/50* (2006.01)
*B64C 1/14* (2006.01)
*E05D 15/10* (2006.01)

(52) U.S. Cl.
CPC .............. *E05D 15/58* (2013.01); *E06B 3/509* (2013.01); *E06B 3/5072* (2013.01); *E05D 15/1005* (2013.01); *E05Y 2900/502* (2013.01)

(58) Field of Classification Search
CPC ............ B64D 11/0606; B64D 11/0023; B64C 1/1423; E05D 15/58; E05D 15/1005
USPC ..................................................... 244/122 R
See application file for complete search history.

(56) References Cited

U.S. PATENT DOCUMENTS

| | | | |
|---|---|---|---|
| 2013/0020369 A1 | 1/2013 | Ple | |
| 2014/0083012 A1* | 3/2014 | Boren | ..................... E06B 3/921 49/176 |
| 2016/0144944 A1* | 5/2016 | Goings | ................... E05F 11/54 244/129.5 |

FOREIGN PATENT DOCUMENTS

| | | |
|---|---|---|
| WO | 2014155354 A1 | 10/2014 |
| WO | 2015006678 A2 | 1/2015 |
| WO | 2015006678 A3 | 1/2015 |

* cited by examiner

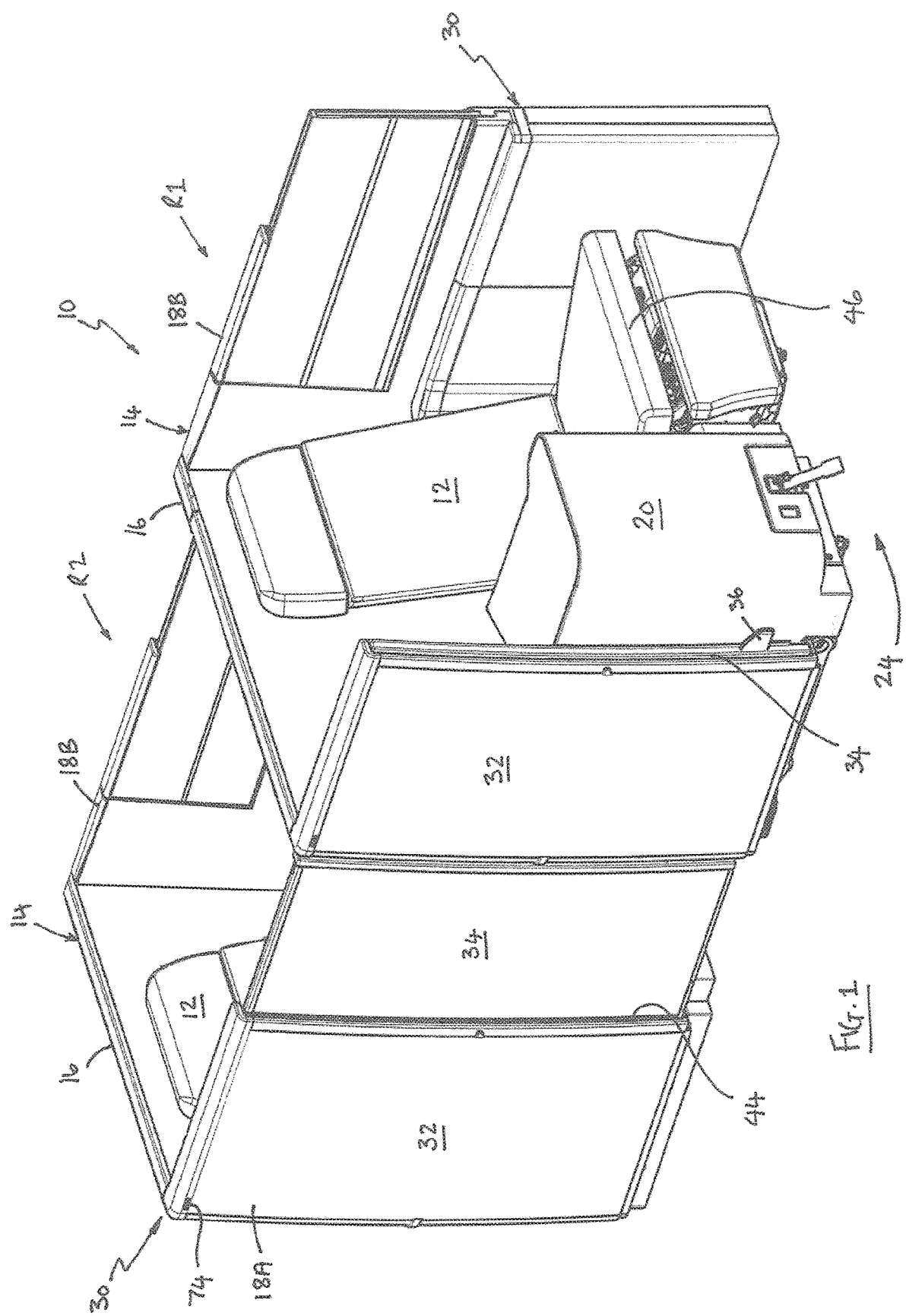

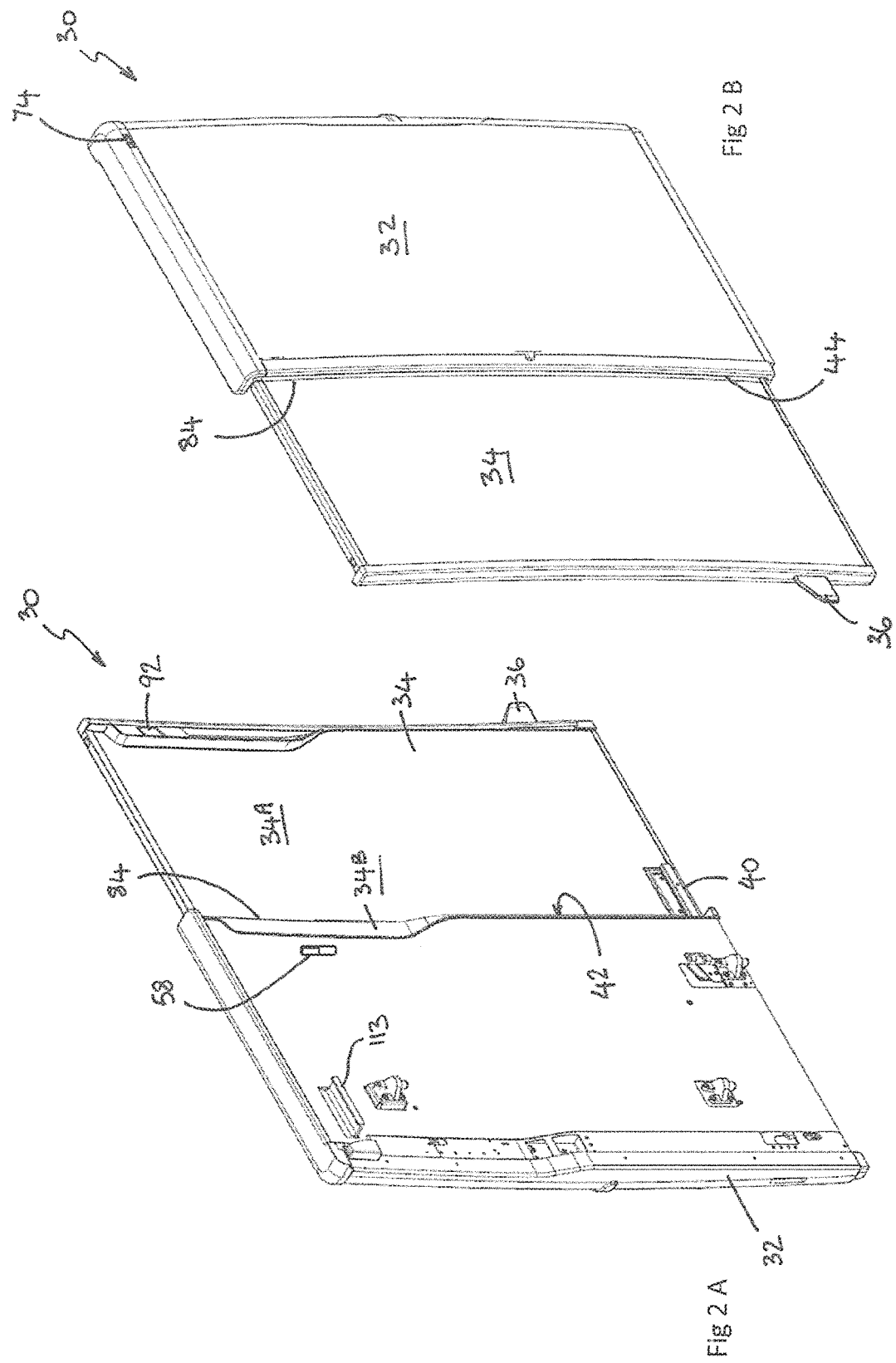

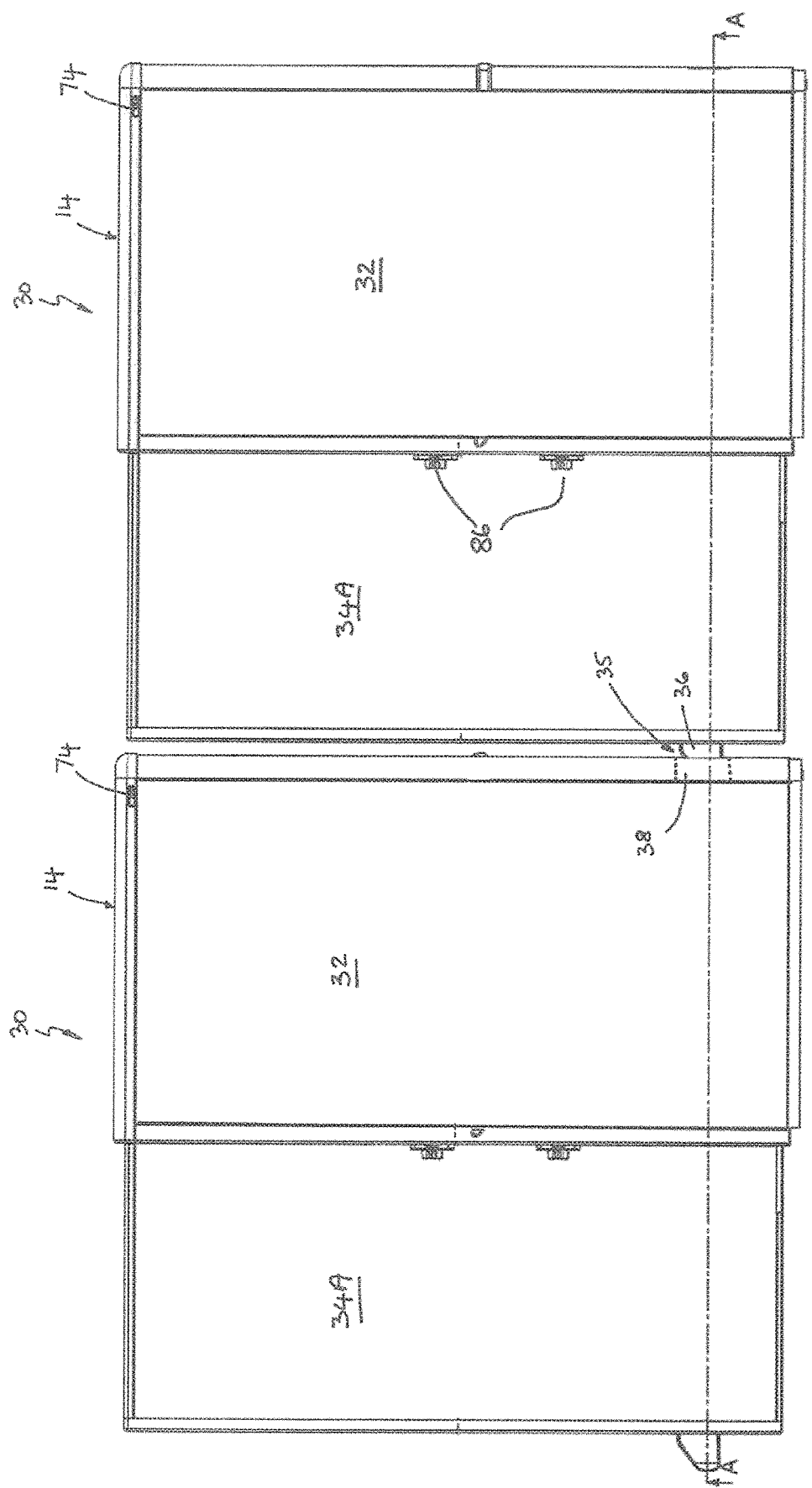

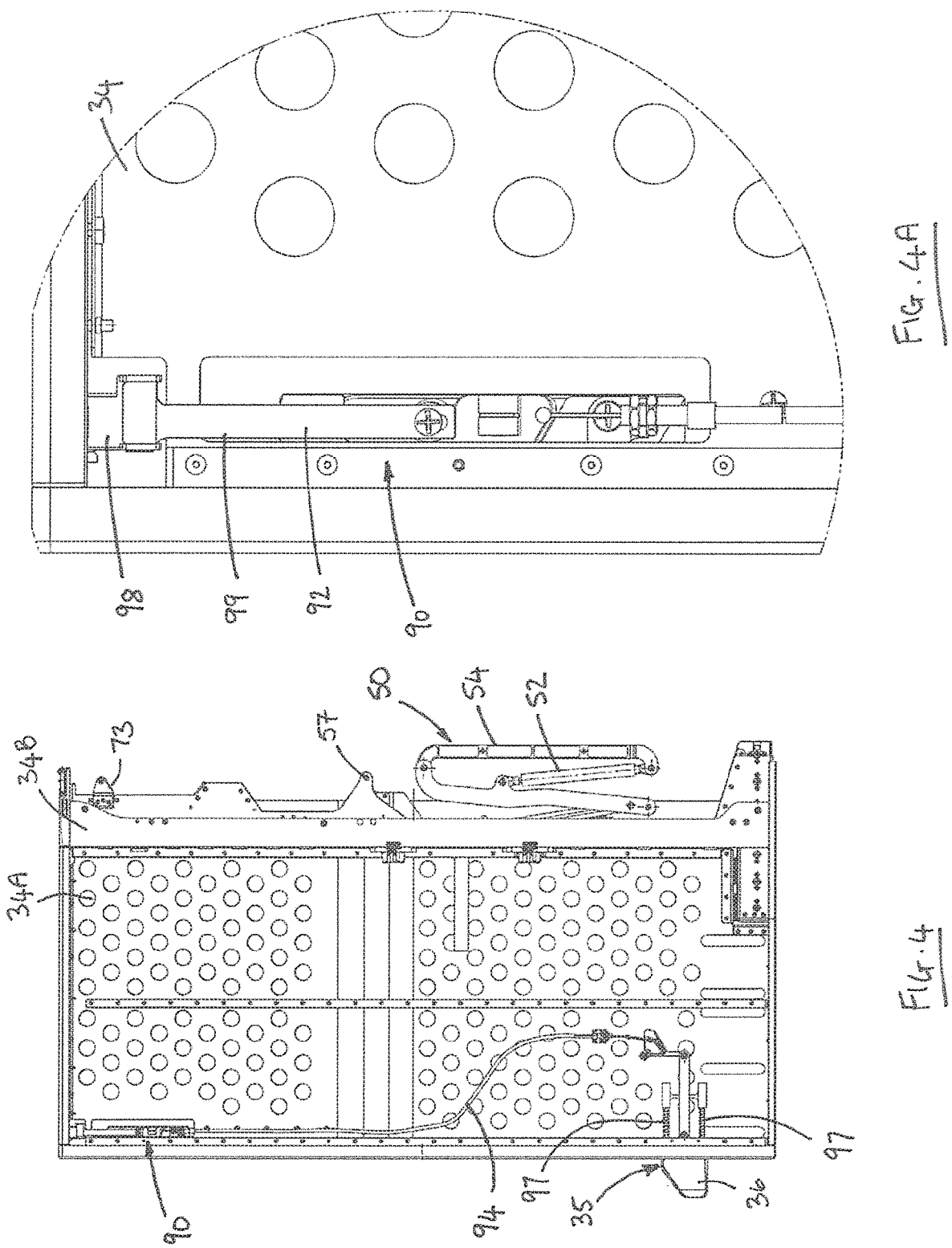

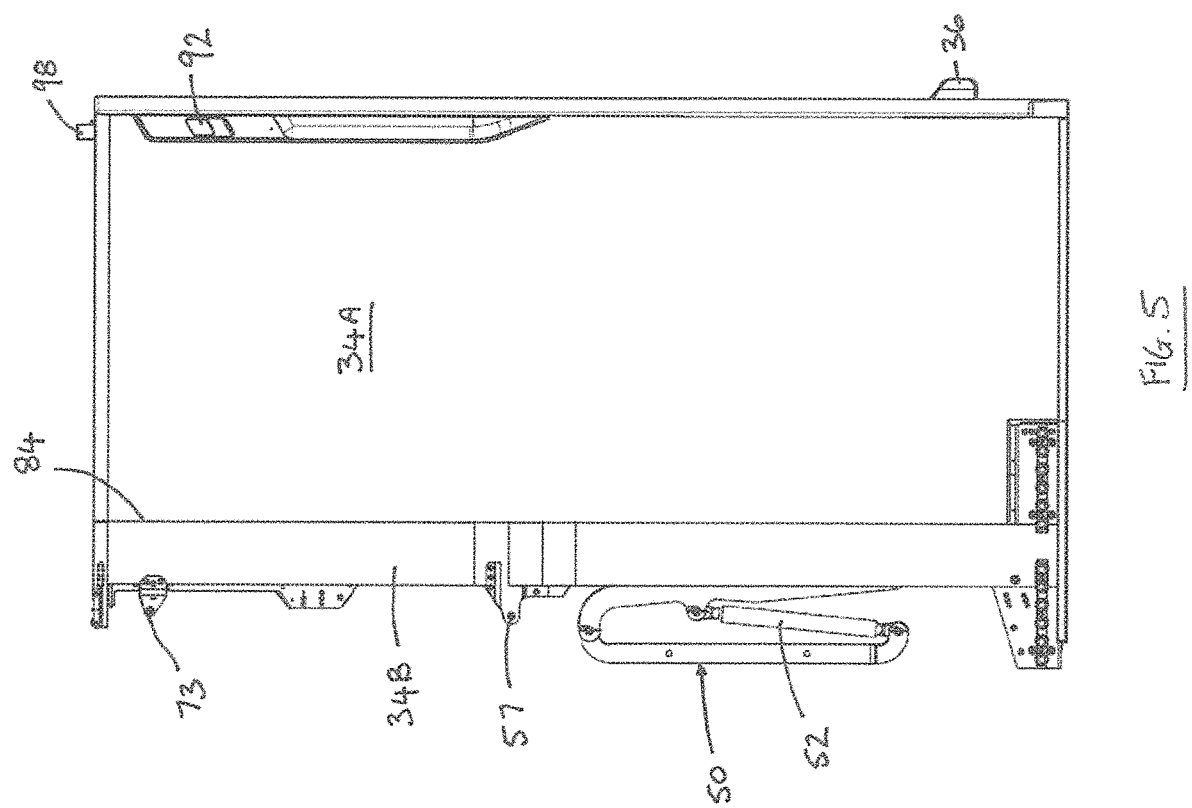

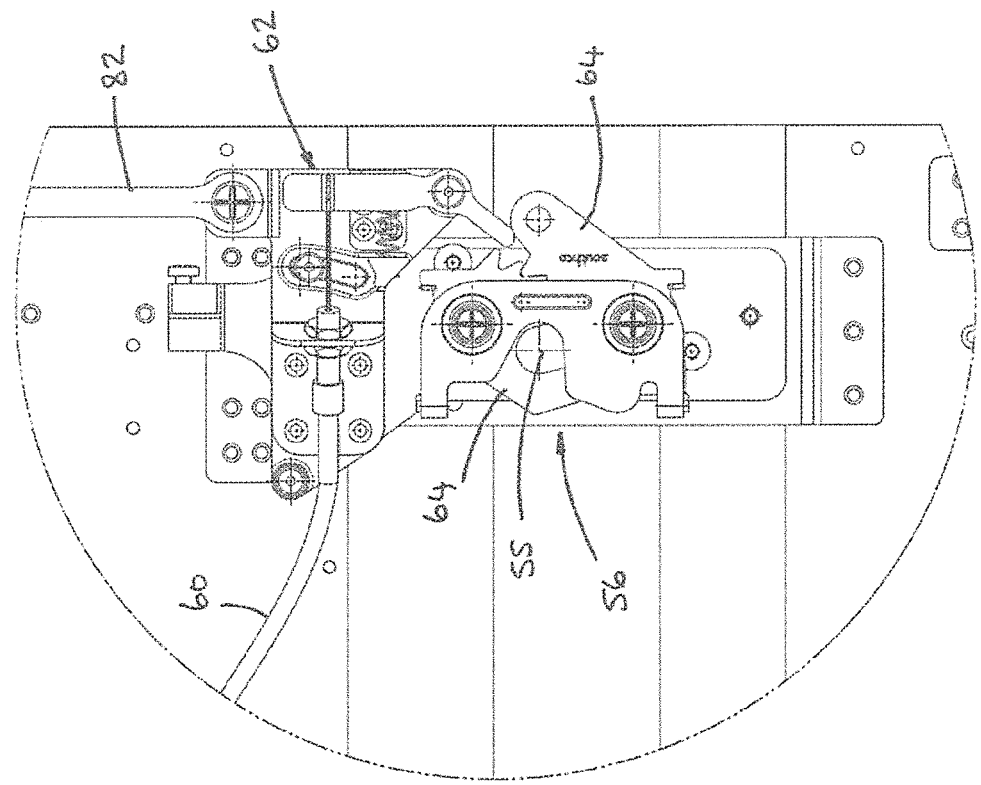
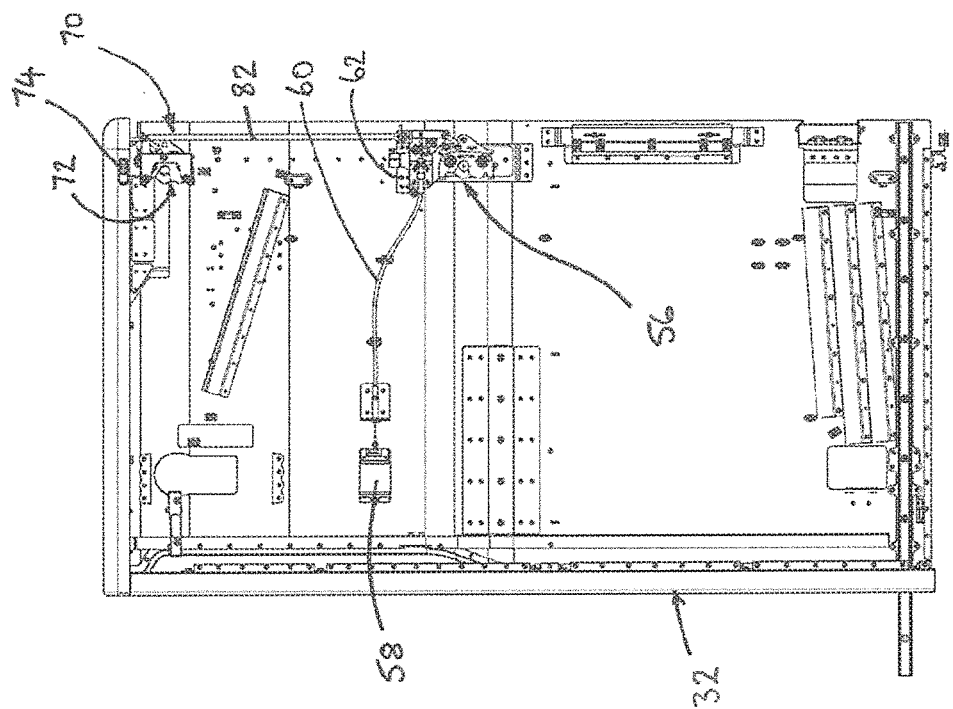

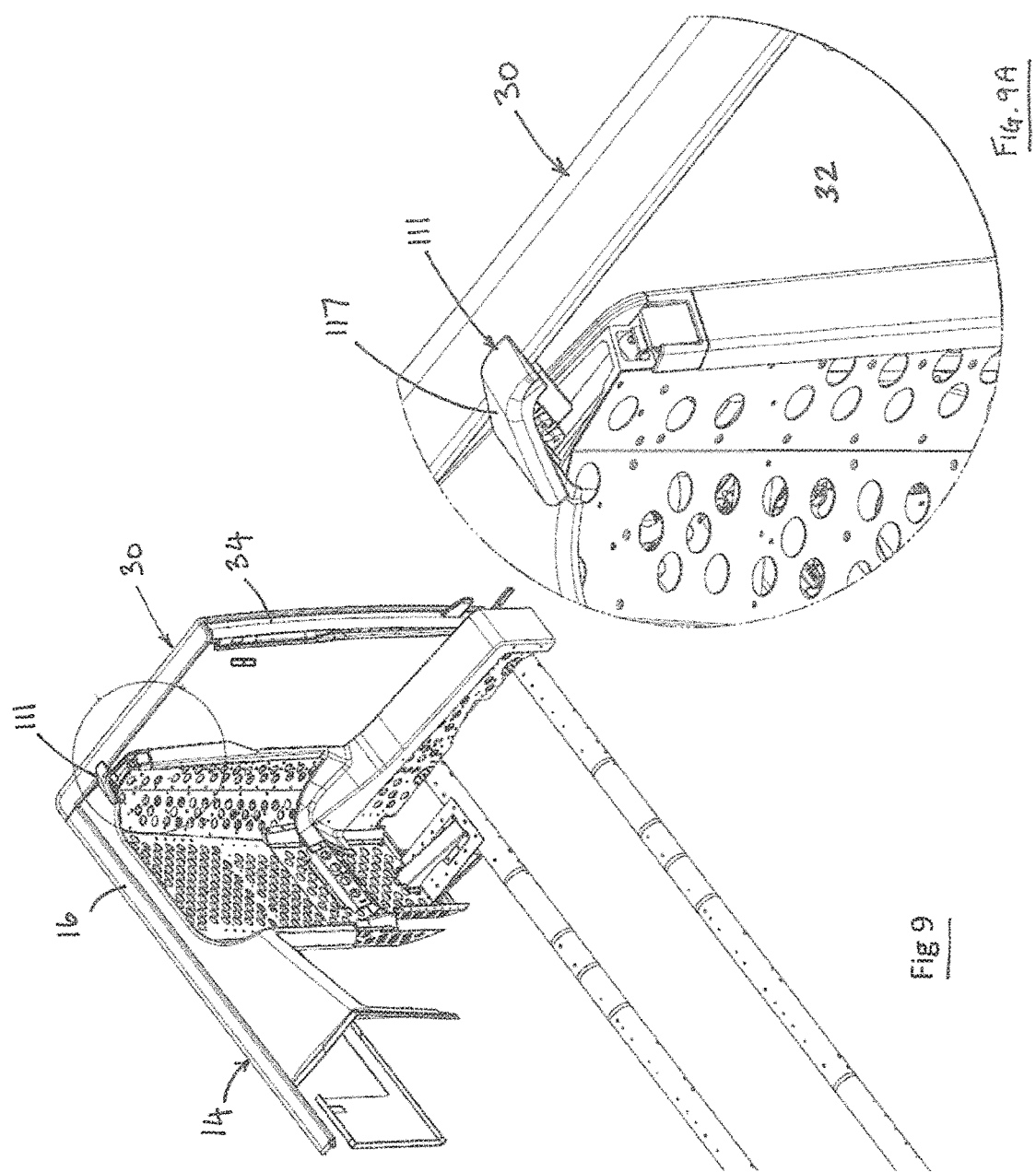

Section A-A

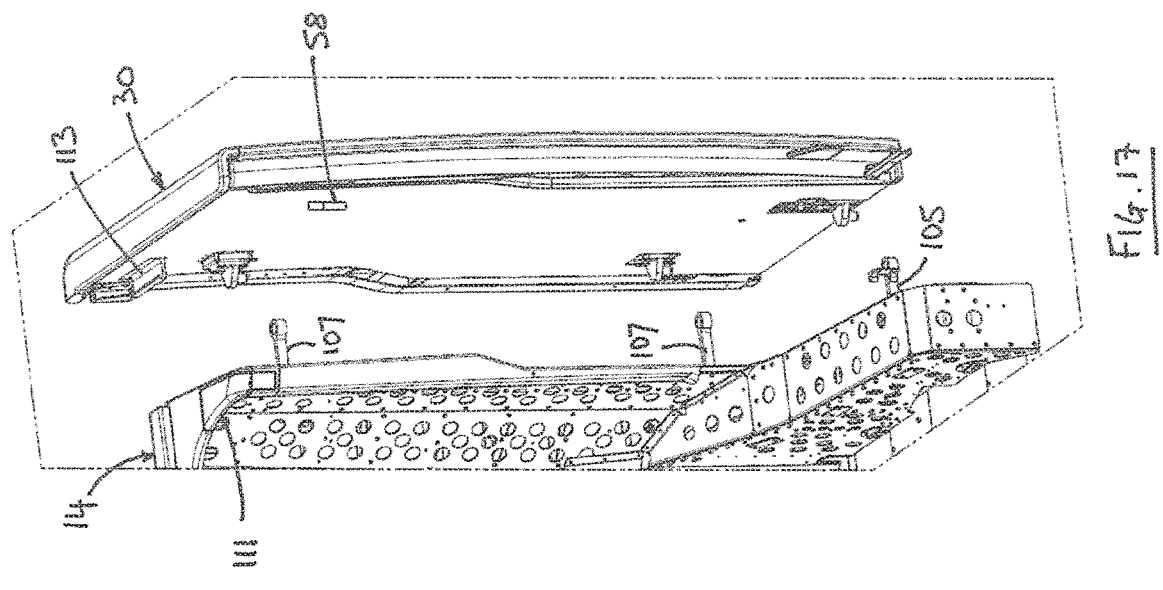
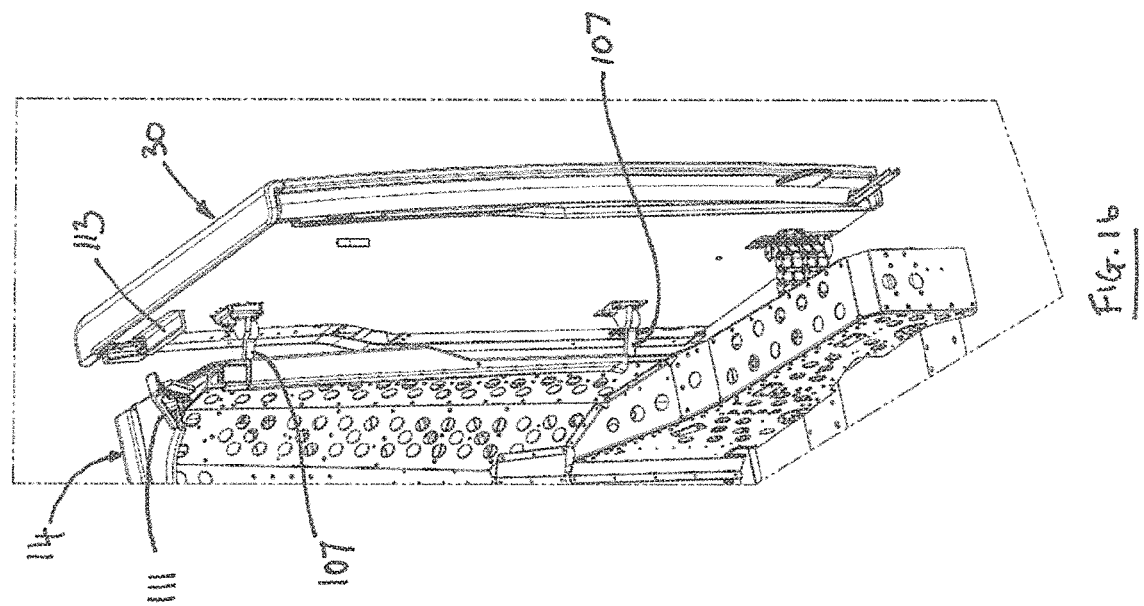

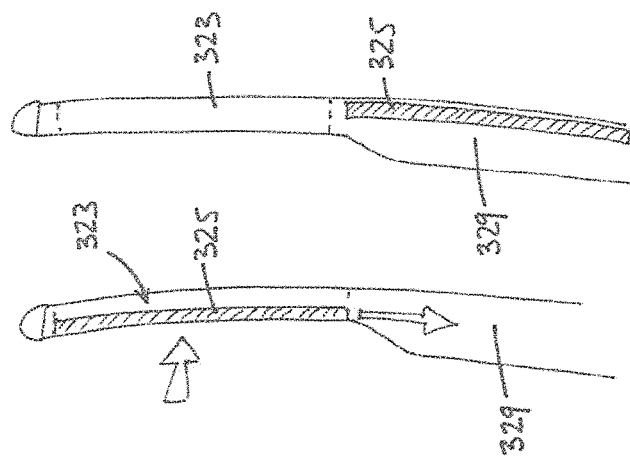
FIG. 20A
FIG. 20B
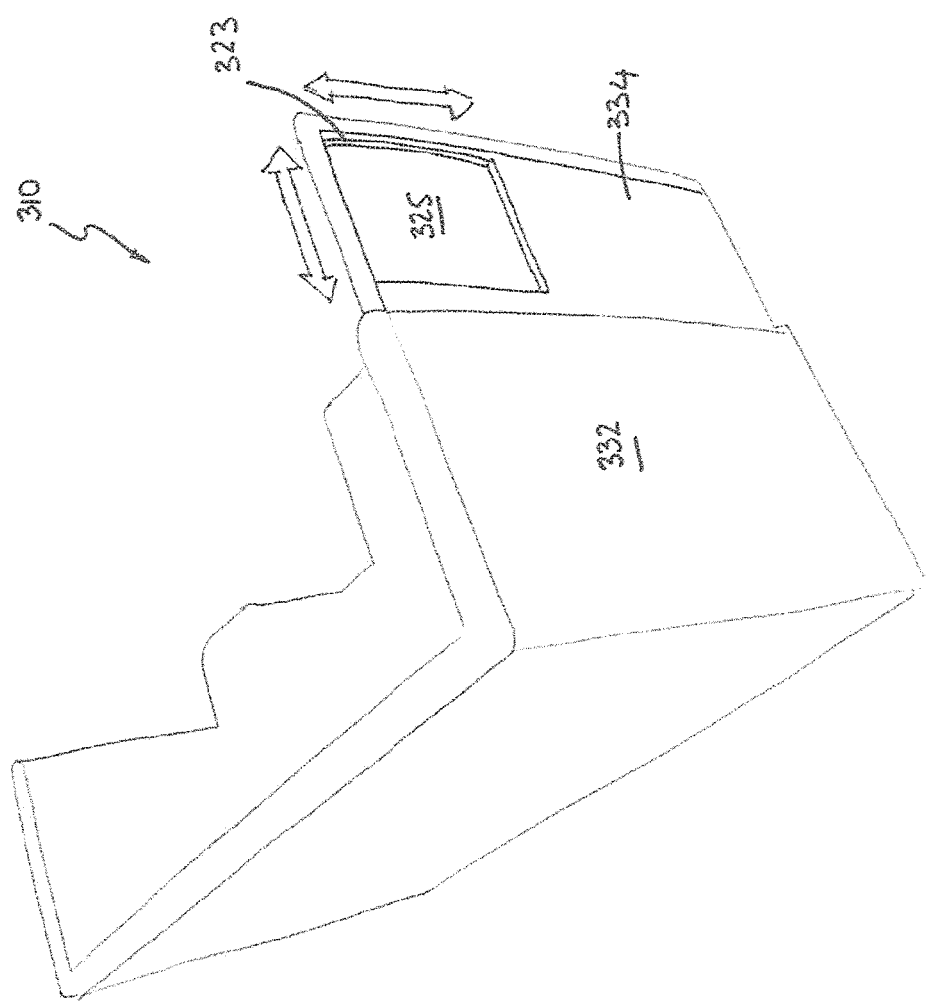
FIG. 20

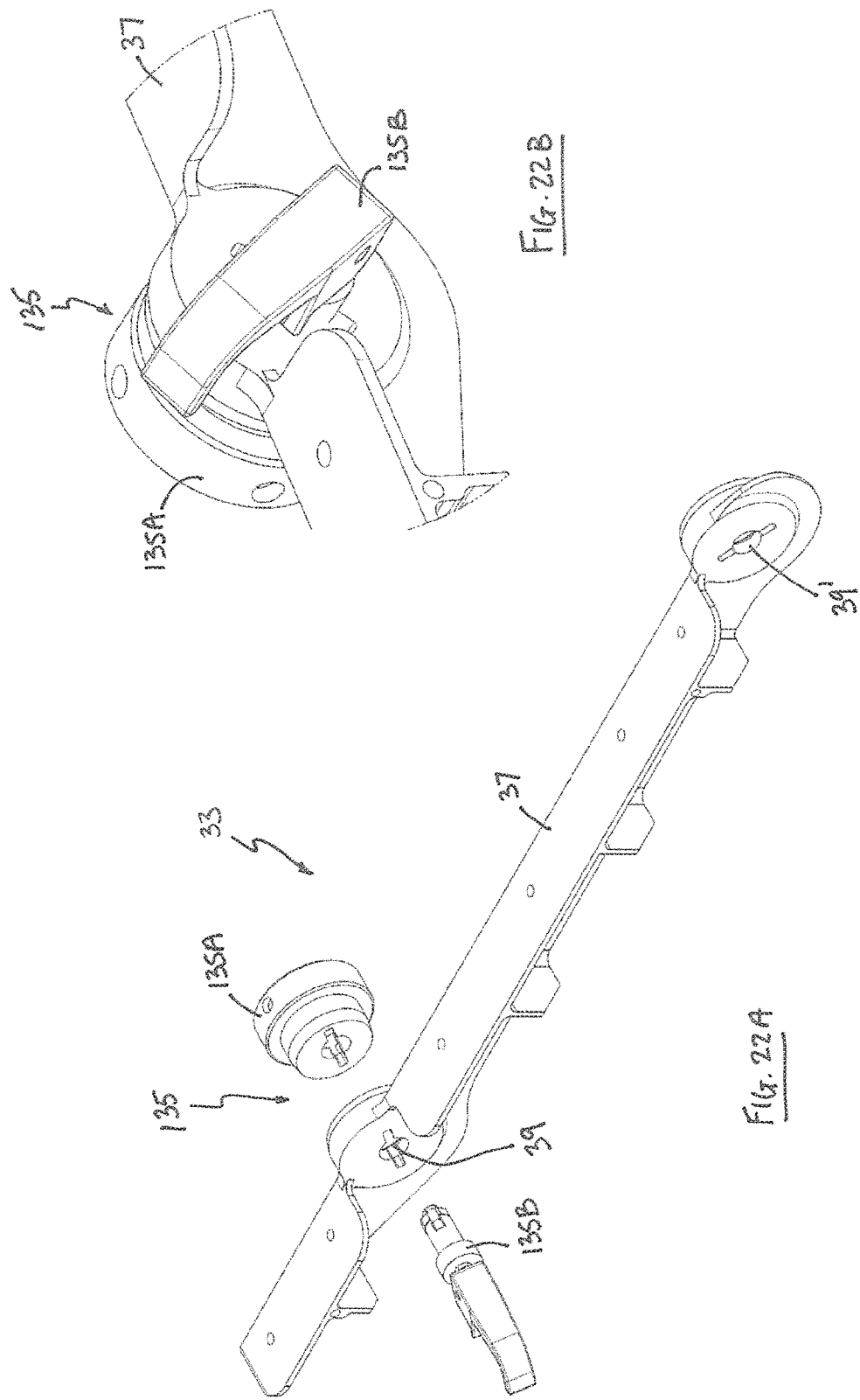

PASSENGER SEATING WITH MULTI-MODE PRIVACY DOOR

CROSS-REFERENCE TO RELATED APPLICATIONS

This application is a continuation of and claims priority to U.S. patent application Ser. No. 15/474,131, filed Mar. 30, 2017, entitled PASSENGER SEATING WITH MULTI-MODE PRIVACY DOOR, which claims priority to foreign application 1605539.4 filed Apr. 1, 2016 with the Intellectual Property Office of Great Britain, entitled PASSENGER SEATING WITH MULTI-MODE PRIVACY DOOR.

FIELD OF THE INVENTION

The present invention relates to passenger seating, especially but not exclusively for aircraft.

BACKGROUND TO THE INVENTION

In vehicles where passengers are seated together in a common seating area privacy can be problem. This is particularly true for aircraft seating, especially premium seating such as first or business class seating, where it may be desirable to provide seated passengers with privacy not only with respect to neighbouring passengers but also with respect to an adjacent aisle.

While it is known to provide inter-seat structures that shield passengers from their neighbours, it is not normal to provide a structure that isolates a seated passenger from an adjacent aisle. This may be for reasons of safety and accessibility: any structure that unduly restricts a passenger's ability to escape from his seat in the event of an emergency may not meet the relevant safety standards, while a structure that restricts access to the seat may be unsuitable for passengers with reduced mobility.

It would be desirable to provide passenger seating that mitigates the problems outlined above.

SUMMARY OF THE INVENTION

A first aspect of the invention provides passenger seating, preferably aircraft passenger seating, comprising at least one seat and at least one respective door assembly located at a side of a respective seat, said the respective door assembly comprising a base portion and a door that, in a primary mode of operation, is movable with respect to the base portion between an open state and a closed state, and wherein said door is configured to support a second mode of opening out of said closed state that is different from said primary mode.

Preferably, said door is slidable with respect to said base portion in a fore-and-aft direction between said open state and said closed state in said primary mode.

In preferred embodiments, said door is configured to support said second mode by being formed in first and second parts that are coupled together at a joint that is exposed from said base portion when said door is in said closed state, said first part of the door being movable with respect to, or separable from, said second part at said joint.

Preferably, said first and second parts are pivotable with respect to each other at said joint. Said joint typically extends substantially vertically in use, preferably along the entire height of the door.

In typical embodiments, said respective seat is located within a shell structure, said door assembly forming part of said shell structure.

Typically, the passenger seating comprises a plurality of rows of at least one seat, the rows being spaced apart to define a gap between adjacent rows, wherein the respective door of the or each respective door assembly of at least one of said rows, when in said closed state, closes the gap between the respective row and the row in front. Said at least one seat of each row may be located within a respective shell structure, and wherein the respective door of the or each respective door assembly of at least one of said rows, when in said closed state, closes the gap between its shell structure and the shell structure of the row in front.

Said base portion is typically panel-like in shape and provides a wall at said side of the respective seat. The base portion conveniently includes a compartment for housing said door when in said open state.

Preferably the, or each, door assembly further includes a first user-operable latch operable to selectively prevent the respective door opening in said second mode, said first user-operable latch preferably not being configured not to prevent operation of said door in said primary mode. In preferred embodiments, said first latch is operable into and out of a latched state in which it prevents said first part of the door being movable with respect to, or being separable from, said second part at said joint, but advantageously does not prevent the door from sliding between its open and closed states. A first latch operating mechanism is preferably provided including a user control for controlling operation of said first latch, said user control preferably being located on an inside surface of said door assembly, more preferably on an inside surface of said door.

Preferably, the or each door assembly further includes an indicating device coupled to the first latch operating mechanism and being operable in response to operation of said first latch operating mechanism to indicate whether or not said first latch is in its latched state. The indicating device may comprise a mechanical flag that is mechanically coupled to said first latch operating mechanism for movement between first and second states corresponding to the latched and unlatched states of the first latch. Preferably, the mechanical coupling is configured such that actuation of said mechanical flag from said second state to said first state causes said first latch to adopt its latched state.

In preferred embodiments the, or each, door assembly includes a second user operable latch mechanism that is operable to selectively retain the respective door in its open state. A second latch operating mechanism is preferably provided including a user control for controlling operation of said second latch mechanism, said user control preferably being located on an inside surface of said door assembly, more preferably on an inside surface of said base portion.

Preferably, the or each door assembly includes a locking mechanism for selectively locking the respective door in its open state. Said locking mechanism preferably includes a third user operable latch mechanism that is operable to selectively retain the respective door in its open state, and a respective latch operating mechanism including a user control for controlling operation of said third latch mechanism, said user control preferably being located on an outside surface or a top surface of said door assembly, more preferably on an outside surface or a top surface of said base portion.

In preferred embodiments, said locking mechanism is coupled to said second latch operating mechanism and is operable to selectively disable said second latch operating mechanism.

In preferred embodiments, the or each door assembly is movable with respect to the respective seat between a normal state and an access state, wherein in said access state said door assembly is located rearwardly, with respect to the direction in which said seat faces, and/or outwardly with respect to said seat of its position in said normal state.

The or each door assembly may be pivotable with respect to said seat between said normal state and said access state. Preferably the or each door assembly is pivotable outwardly and rearwardly with respect to said seat by means of at least one pivotable linkage, the or each pivotable linkage preferably comprising first and second parallel links, each link conveniently being pivotably coupled to the door assembly and to the shell structure. Alternatively the or each door assembly is slidable with respect to said seat between said normal state and said access state by means of at least one sliding mechanism, the or each sliding mechanism conveniently being provided at a lower end of the door assembly.

Preferably at least one respective door assembly release mechanism, preferably comprising a respective clamp, is provided for releasably retaining the respective door assembly in its normal state.

In some embodiments, said door is configured to support said second mode by being shaped to define a hatchway that is exposed from the base portion when the door is in the closed state and is dimensioned to allow a person to pass therethrough, and further including means for closing said hatchway. Said closing means may comprise a hatch or a blind that can be opened to expose the hatchway, or may comprise a covering formed from a frangible material.

Optionally, one or more frangible devices, for example frangible pins, couple the first and second parts of the door together at the joint and/or couple the closure means to the door.

Typically the or each door assembly includes actuation means for moving the door from the open state to the closed state and/or from the closed state to the open state, the actuation means preferably comprising an extendible actuator coupled between the door and the base, and optionally being biased to urge the door into its closed state. Said second latch mechanism, in its latching state, may hold said door in its open state against the bias of said actuation means, whereupon un-latching of said second latch mechanism causes said door to move to said closed state under the action of said actuation means.

Advantageously in said access state, said door assembly is removable from the passenger seating, in particular from said shell structure.

Preferably, the or each door assembly release mechanism comprises a clamp that is manually operable, for example by a lever or other user control. Advantageously, when the clamp is not in its clamping state, the lever or other use control projects upwardly, preferably such that it is visible above the level of the door assembly and/or shell structure. Preferably at least a part, preferably an underside, of the lever or other user control is coloured in a high visibility manner, said part preferably being a part that is visible only when the lever or other user control is in the non-clamping position.

The or each door assembly may be associated with a respective door assembly release mechanism comprising a clamp that is operable into and out of a clamping state in which it holds the door assembly in a fixed position with respect to the shell structure and/or the respective seat, and wherein, preferably, when out of the clamping state, allows the door assembly to move between its normal state and its access state. The clamp is located at an in use lower portion of the door assembly, for example at a lower support structure provided along a lower end of the door assembly.

In preferred embodiments the clamp comprises first and second inter-engagable clamping components in the form of a socket and a removable clamping pin, an aperture being formed in a fixed portion of the door assembly, through which the pin is insertable, and wherein the socket is provided in a fixed position with respect to the seating, for example fixed to the shell, or to a seat support or to the floor on which the passenger seating is located in use.

In preferred embodiments, in the clamping state, the pin is inserted through a fixed portion of the door assembly and into the socket thereby clamping the door assembly in a fixed position with respect to the seat, and wherein in the non-clamping state the clamp does not prevent movement between the door assembly and the seat to allow movement of the door assembly into and out of an access state or optionally removal of the door assembly from the passenger seating.

Optionally, a locking mechanism is provided for releasably locking the door assembly in said normal state, and when released, allowing the door assembly to move between its normal state and its access state. The locking mechanism may comprise a locking pin assembly that is operable into and out of a locking state in which it holds the door assembly in a fixed position with respect to the respective seat, the locking pin assembly having a locking pin connected to an operating device and movably coupled to a support structure, the locking pin being movable between an extended position and a retracted position with respect to the support and is preferably resiliently biased into the extended position. Conveniently said operating device comprises a pedal or other manually operable device.

In typical embodiments, said at least one seat comprises a plurality of seats arranged in at least one row, a respective door assembly being located at the, or each, end of the or each row.

A second aspect of the invention provides a door assembly for passenger seating, the door assembly comprising a base portion and a door that, in a primary mode of operation, is movable with respect to the base portion between an open state and a closed state, and wherein said door is configured to support a second mode of opening out of said closed state that is different from said primary mode.

Further preferred features are recited in the dependent claims.

Further advantageous aspects of the invention will be apparent to those ordinarily skilled in the art upon review of the following description of specific embodiments and with reference to the accompanying drawings.

BRIEF DESCRIPTION OF THE DRAWINGS

Embodiments of the invention are now described with reference to the drawings in which like numerals are used to denote like parts and in which:

FIG. 1 is a perspective view of passenger seating, in particular aircraft seating, embodying one aspect of the invention;

FIG. 2A is an inside perspective view of a door assembly shown in a closed state, the door assembly embodying a second aspect of the invention and being suitable for use with the passenger seating of FIG. 1;

FIG. 2B is an outside perspective view of the door assembly of FIG. 2A shown in the closed state;

FIG. 3 is a side view of two adjacent instances of the door assembly of FIG. 2A, each shown in the closed state;

FIG. 4 is an inside side view of a door being part of the door assembly of FIG. 2A, the door being shown with its inside facing removed;

FIG. 4A is an enlarged view of a first latch operating mechanism included in the door of FIG. 4;

FIG. 5 is an outside view of the door of FIG. 4;

FIG. 6 is an outside side view of a door housing being part of the door assembly of FIG. 2A, the door housing being shown with its outside facing removed;

FIG. 6A is an enlarged view of a second latch mechanism included in the door housing of FIG. 6, the latch mechanism being shown in a latching state and with an associated latch operating mechanism in an enabled state;

FIG. 9 is a perspective view of part of the seating of FIG. 1, highlighting the door assembly release mechanism, the mechanism being shown in a releasing state;

FIG. 9A is an enlarged view of the door assembly release mechanism shown in the releasing state;

FIG. 16 is a perspective view of part of the seating of FIG. 1, with the door assembly shown in the access state;

FIG. 17 is a perspective view of part of the seating of FIG. 1, with the door assembly shown in a disassembled state;

FIG. 20 is a perspective view of passenger seating with a further alternative embodiment of a door assembly;

FIG. 20A is a side view of a door included in the door assembly of FIG. 20, the door being shown with an escape hatch in a closed state;

FIG. 20B is a side view of a door included in the door assembly of FIG. 20, the door being shown with an escape hatch in an open state;

FIG. 22A is a perspective view of a further door assembly release mechanism shown in a non-clamping state;

FIG. 22B is a perspective view of the further door assembly release mechanism shown in a clamping state;

DETAILED DESCRIPTION OF THE DRAWINGS

Figure 2C:
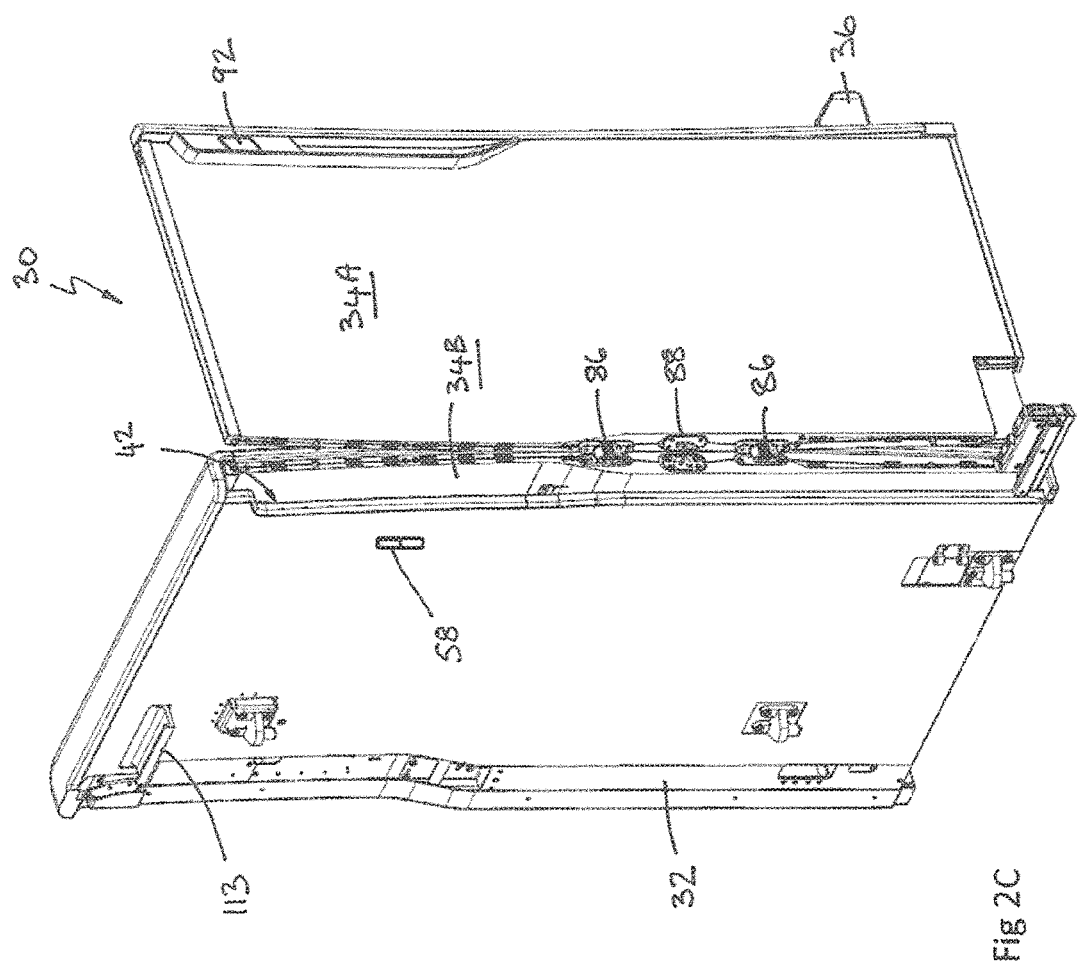
FIG. 2C is an inside perspective view of the door assembly of FIG. 2A shown in an open state.

Referring now to the drawings there is shown, generally indicated as 10, passenger seating embodying one aspect of the invention. Passenger seating embodying the invention is particularly suitable for use in vehicles (e.g. aircraft, boats, trains and buses) where the seating is located in a common passenger area, for example an aircraft cabin, having one or more aisles running alongside the seating. In preferred embodiments, the seating 10 is aircraft seating and is located, in use, in an aircraft cabin (not shown).

In the following description, it is assumed that a seated passenger faces in a forward direction and so terms such as forward, front, rearward, rear and fore-and-aft are intended to be construed accordingly. The term "vertical" is intended to mean perpendicular to the surface on which the seating is located in use.

The seating 10 comprises at least one seat 12, usually a plurality of seats 12 arranged in an array of one or more rows R1, R2, each row having one or more seats 12. In FIG. 1, two rows R1, R2 each with a single respective seat 12 are shown by way of example. Hence, at the rear of the seating 10 and/or in front of it there may be provided more seating (e.g. additional row(s) of seat(s) 12). Alternatively, when the seating is installed in a cabin, a bulkhead (not shown) may be located in front of and/or behind the seating 10. When the seating 10 is located in a cabin, an aisle is located alongside the seating 10 on one or both sides, typically running substantially perpendicular with the rows R1, R2. The, or each, aisle may separate the seating 10 from additional seating (not shown but which may be the same as the seating 10), bulkhead or cabin wall (not shown).

Each seat 12 is typically located within a shell structure 14 that partially surrounds the seat 12. The shell structure 14 typically includes a back portion 16 behind the seat 12 and at least one side portion 18. At at least one side of the seat 12, the side portion 18 may include a console 20, which may be configured to serve as an armrest and/or may include a deployable table and/or other facilities. The shell structure 14 may be shared by more than one seat 12 of the same row R1, R2, for example being configured to provide the back portion 16 and side portion(s) for each seat 12. For example, in FIG. 1 each row R1, R2 has a respective shell structure 14 configured to provide a respective back portion 16, a respective near side 18A including a side console 20, and a respective far side 18B for the seat 12 in the respective row R1, R2. In alternative embodiments (not illustrated) where the or each row has more than one seat, a screen and/or a console separating adjacent seats in a row may be provided, conveniently as part of a common shell for the row. The seats 12 are typically of a type that can recline to form a bed.

It will be apparent that the shell structure 14 provides a seated passenger (not shown) with some privacy from other passengers seated in the same row and in adjacent rows. However, the shell structure 14 must allow space for the passengers to access the seat 12 from the aisle and vice versa. Accordingly, the side portion 18A that is, in use, adjacent an aisle is configured to provide a gap 24 for ingress to and egress from the end seat 12 in the respective row. In typical embodiments, this means that the side portion 18A does not extend fully and permanently to the shell structure 14 of the row in front, or to a bulkhead in front, as applicable. This is in contrast to the far side portion 18B which may extend fully and permanently to the to the shell structure 14 of the row in front, or to a bulkhead in front, as applicable. In this example it is assumed that when the seating 10 is installed, access to the seat 12 is not required from beyond the far side 18B. This might be because, for example, the far side 18B is, when installed, adjacent a cabin wall or a bulkhead, or is adjacent another seat (in the case of a multi-seat row embodiment), To improve privacy, the side portion 18A comprises a door assembly 30 embodying one aspect of the invention. The door assembly 30 comprises a base portion 32, which extends along the aisle-side of the seat 12 typically from the back 16 of the shell 14, and is typically panel-like in form. The base portion, which is typically substantially rectangular in shape, provides a wall on one side (the aisle-side) of the seat 12, typically as part of the shell structure 14. The door assembly also comprises a door 34 that is movable with respect to the base 32 between an open state in which the ingress/egress gap 24 is provided, and a closed state in which the gap 24 is closed. It will be understood that the word "closed" in this context does not necessarily mean that the gap 24 is eradicated completely and is therefore intended to embrace "fully closed" and "substantially closed". In preferred embodiments, and as is illustrated by way of example in FIG. 3, the arrangement is such that, in the closed state, the door 34 engages with the shell structure 14 of the row in front (or the bulkhead in front as applicable), or is at least close enough to enable a latching formation 36 carried by the door 34 to engage with a corresponding latching formation 38 provided on the forward shell structure 14/bulkhead (see FIG. 3). The latching formations 36, 38 are parts of a first latch 35, as is described in further detail hereinafter.

In preferred embodiments, the door 34 is a sliding door, i.e. is slidable with respect to the base 32 between the open and closed states. To facilitate sliding movement of the door 34, the door 34 may be coupled to the base 32 by one or more slide mechanism 40, for example comprising slide rails and/or rollers, which may be provided at the top and/or bottom of the door 34. Preferably, the base 32 comprises a compartment 42 for housing the door 34 when open, the compartment having a mouth 44 through which the door 34 slides into and out of the compartment. The compartment 42 is preferably dimensioned to house substantially the entire door 34 when open. Accordingly, when the door 34 is open, the gap 24 is defined between the leading end of the base 32 and the forward shell structure 14/bulkhead. Alternatively, the arrangement may be such that part of the door projects from the base 32 when open in which case the gap 24 is defined between the leading end of the door 34 and the forward shell structure 14/bulkhead. In alternative embodiments, the arrangement may be such that the door 34 slides alongside the base 32 rather than into a compartment in the base.

In any event, the door assembly 30 provides some privacy along the aisle-side of the seat 12 whether or not the door 34 is open since the base 32 extends along side the seat 12, and is typically panel-like in form. However, greater privacy is provided when the door 34 is closed. It is preferred that, when the door 34 is open, the door assembly 30 (i.e. the leading edge of the base 32 or the leading edge of the open door 34 as applicable) extends no further forward than the forward end of the seat pan 46 of the seat 12 to ensure that an adequate gap 24 is provided. It will be apparent that that the height of the door assembly 30 affects the privacy afforded to the passenger. It is preferred that the height of the base 32 and the door 34 is approximately level with the head rest 48 of the seat 12. Preferably, the base 32 and the door 34 are each solid and opaque to maximize privacy. The door 34 is typically substantially rectangular in shape.

By way of example, in FIG. 1, the door 34 of row R1 at the front of the seating 10 is shown in the open state, while the door 34 of row R2 at the back is shown in the closed state. In cases where access is required from one or both ends of a row, e.g. where there is an aisle running alongside the or each end of the row, a respective door assembly is provided for the seat at the or each end of each row, as required. In the case where there is only one seat in the row, a respective door assembly may be provided on each side of the seat.

With reference to FIGS. 4 and 5, in preferred embodiments, the door assembly 30 includes actuation means 50 for moving the door 34 from the open state to the closed state and/or from the closed state to the open state. The actuation means 50 may comprise an extendible actuator 52, such as a hydraulic ram, gas spring or mechanical spring, coupled between the door 34 and the base 32. The actuator 52 may be biased to adopt its extended state, e.g. by hydraulic, gas, mechanical or other resilient biasing means. In the illustrated embodiment, in order to provide the desired travel for the door 34, the actuator 52 is incorporated into an extendible linkage 54; extension of the actuator 52 extends the linkage 54 to push the door 34 closed. The illustrated linkage 54 is pivotably connected to the door 34 and may also be pivotably connected to the base 32, although it may alternatively abut against the base 32. The door 34 may be returned to the open state by a user manually pushing the door 34 against the bias of the actuator 52. In alternative embodiments, the actuator may be power operated (e.g. hydraulically, pneumatically or electrically operated) and/or may be operable to move the door 34 between the open and closed states in both directions. Alternatively still, the door 34 may be manually operable, i.e. the actuation means may be omitted.

Figure 6C:
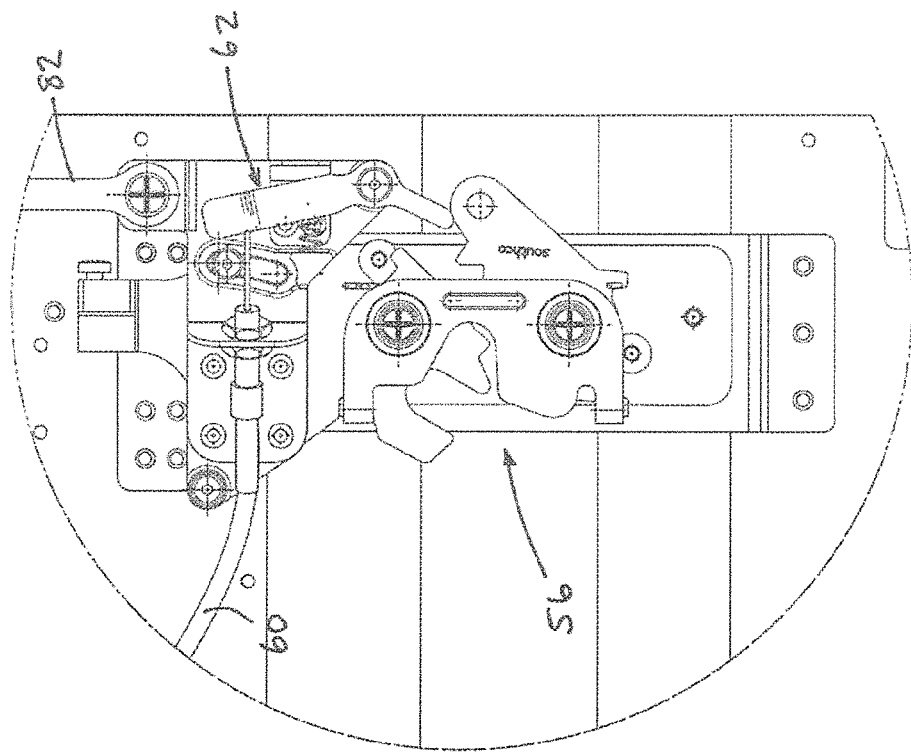
FIG. 6C is an enlarged view of the second latch mechanism included in the door housing of FIG. 6, the latch mechanism being shown in a non-latching the state and with the latch operating mechanism being shown in the enabled state.
Figure 6B:
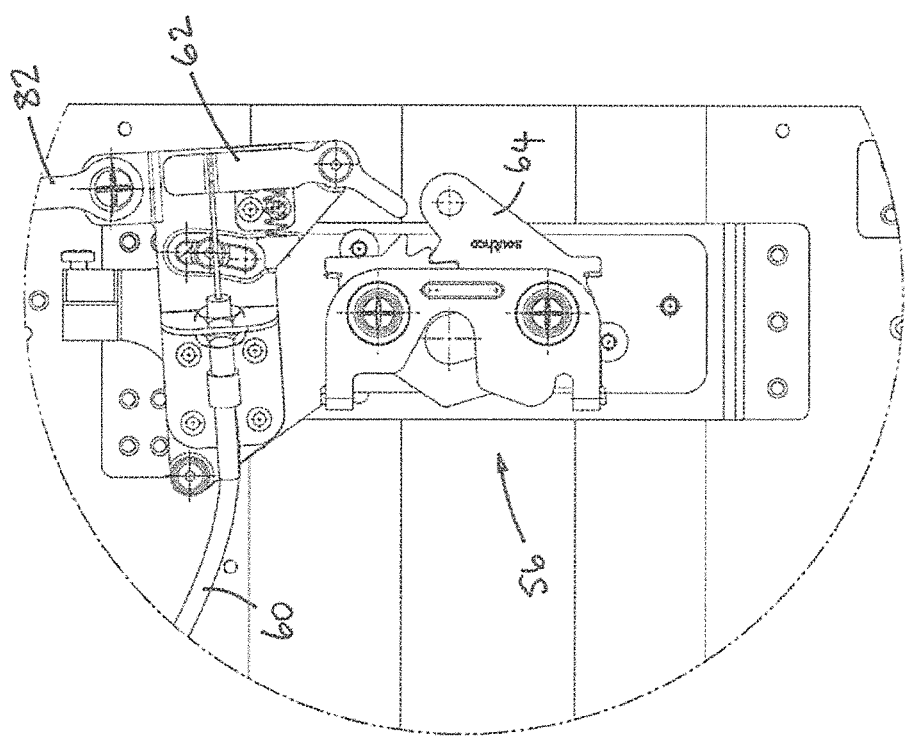
FIG. 6B is an enlarged view of the second latch mechanism included in the door housing of FIG. 6, the latch mechanism being shown in the latching state and with the latch operating mechanism being shown in a disabled state.

Referring now to in particular to FIG. 6, the door assembly 30 includes a second latch mechanism 56 that is operable to selectively retain the door 34 in its open state or release it to allow it to close. In the illustrated embodiment, the latch mechanism 56 is provided on the base 32 and is releasably engagable, via aperture 55, with a pin 57 or other latchable formation on the door 34. Alternatively, the latch mechanism 56 may be provided on the door 34 and the latchable formation 57 provided on the base 32. In any event, when the latch 56 retains the pin, the door 34 is held in its open state, otherwise the latch does not prevent the door 34 from closing. The latch 56 is operable by a seated passenger and to this end a latch control 58 is provided for the passenger, conveniently on the inside face (i.e. passenger side) of the base 32 adjacent the seat 12. In the illustrated embodiment, the latch 56 is operated mechanically by a cable 60, or other mechanical linkage, that connects the latch control 58 to a latch operating device 62. The latch operating device 62 is engagable with the latch 56 and, depending on the operation of the latch control 58, actuates the latch 56 between its latching and non-latching states, which are shown in FIGS. 6A and 6C respectively. In this example, the latch 56 comprises jaws 64 that are pivotable by the operating device 62. The operating device conveniently comprises a lever that is pivotable by the cable 60, and the user control 58 may also comprise a lever attached to the cable 60. The latch control 58, linkage 60 and operating device 62 may collectively be referred to as a latch operating mechanism. In alternative embodiments the latch operating mechanism, and/or the latch 56, may take any other suitable forms, and may for example be electrically and/or wirelessly operated.

The door assembly 30 preferably also includes a locking mechanism 70 for selectively locking the door 34 in its open state. The preferred locking mechanism 70 achieves this by two means; by provision of a further latch mechanism 72 for selectively retaining the door 34 in its open state; and by selectively disabling the latch operating device 62. In alternative embodiments either one or these means may be provided without the other. In the illustrated embodiment, the latch mechanism 72 is provided on the base 32 and is releasably engagable with a pin 73 or other latchable formation on the door 34. Alternatively, the latch mechanism 72 may be provided on the door 34 and the latchable formation 73 provided on the base 32. In any event, when the latch 72 retains the pin 73, the door 34 is held in its open state, otherwise the latch does not prevent the door 34 from closing. The latch 72 is intended for operation by a person located in the aisle, e.g. a member of the aircraft cabin crew, to this end a latch control 74 is provided for such a person. Preferably, the control 74 is provided on outside (i.e. the aisle-side) face of the base 32 or at the top of the base. In any event it is preferred that the control 74 is not readily accessible to a seated passenger.

Figure 7B:
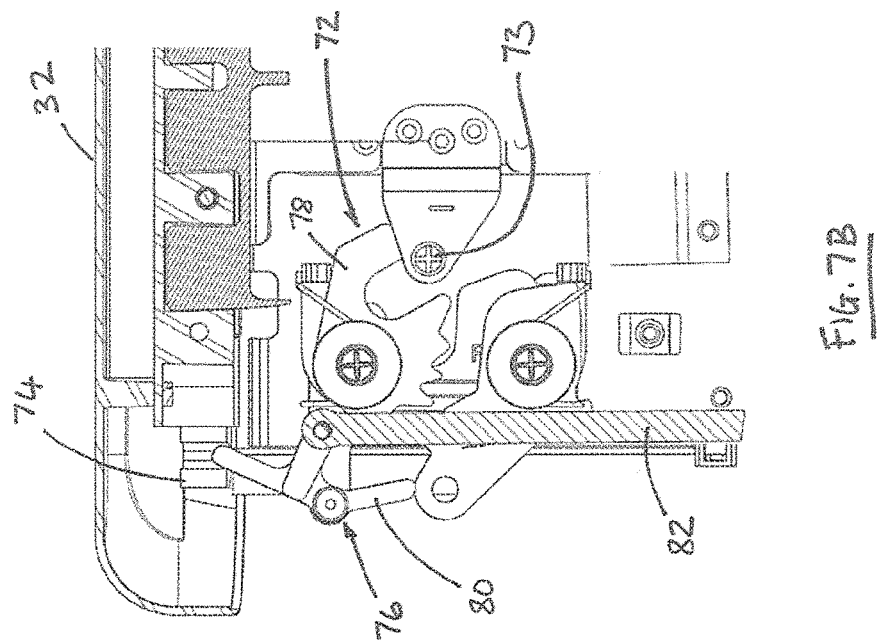
FIG. 7B is a side view of the locking mechanism of FIG. 7A shown in a non-locking state.
Figure 7A:
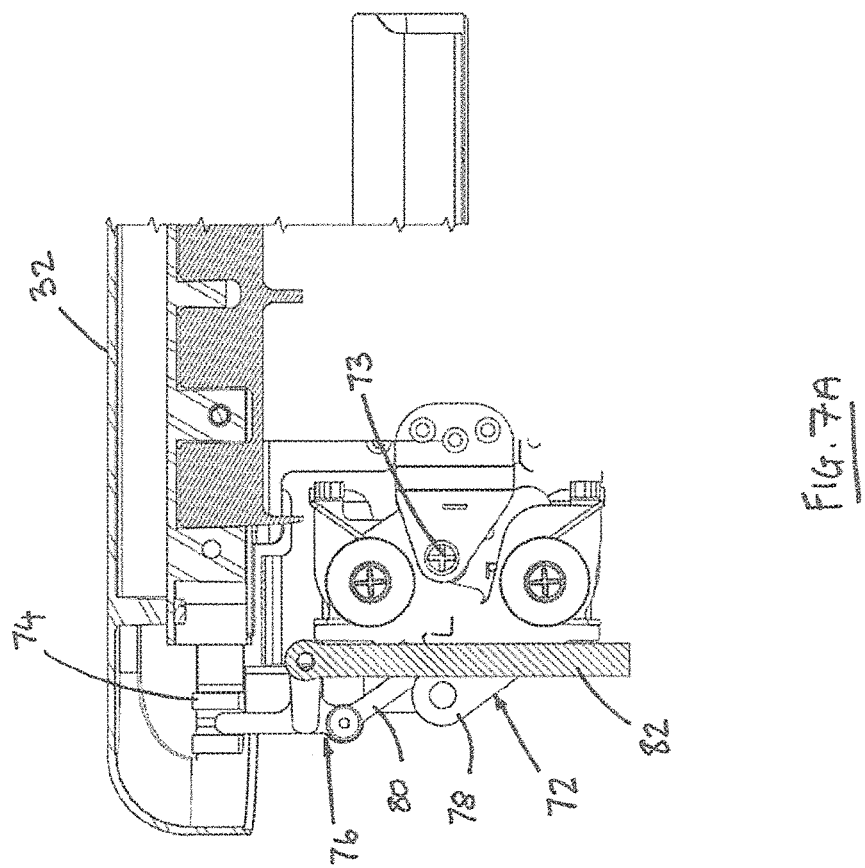
FIG. 7A is a side view of a locking mechanism included in the door housing of FIG. 6, the locking mechanism being shown in a locking state.
Figure 8A:
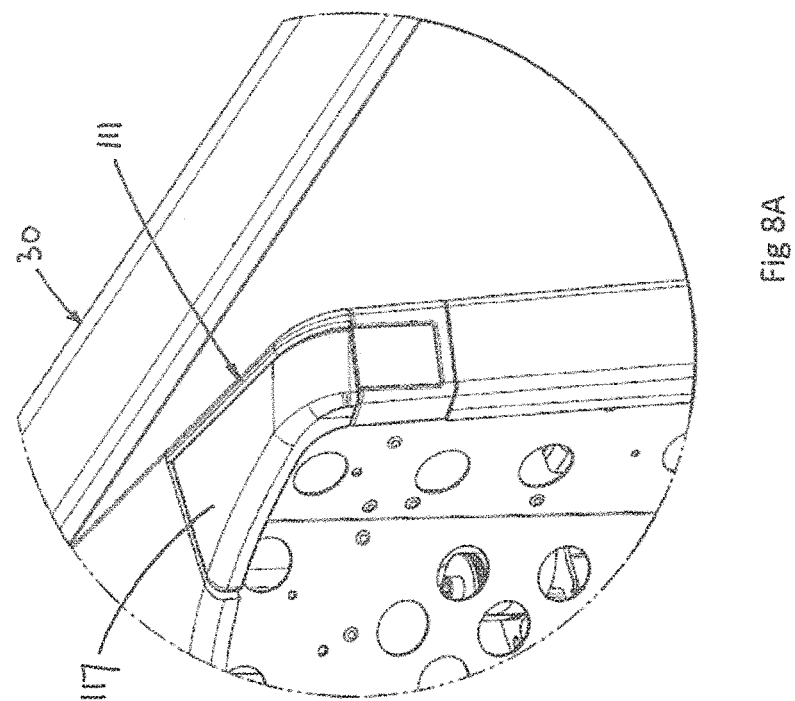
FIG. 8A is an enlarged view of the door assembly release mechanism shown in a non-releasing state.
Figure 8:
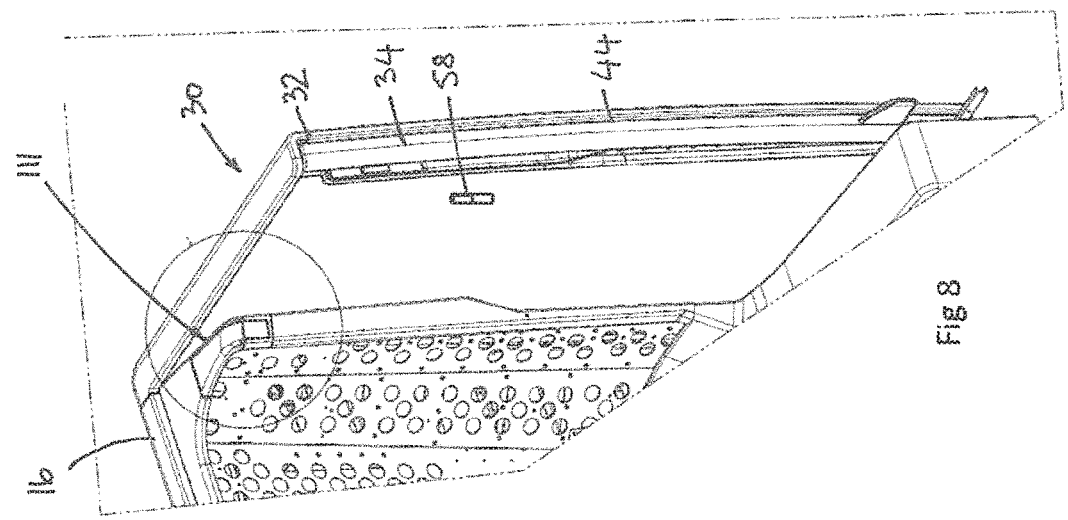
FIG. 8 is a perspective view of part of the seating of FIG. 1, highlighting a door assembly release mechanism.

Referring in particular to FIGS. 7A and 7B, in the illustrated embodiment, the latch 72 is operated mechanically by a latch operating device 76 that couples the latch control 74 mechanically to the latch 72. The latch operating device 76 engages with the latch 72 and, depending on the operation of the latch control 74, actuates the latch 72 between its latching and non-latching states, which are shown in FIGS. 7A and 7B respectively. In this example, the latch 72 comprises jaws 78 that are pivotable by the operating device 76. The operating device 76 conveniently comprises a lever 80 that is pivotable by user control 74 to operate the latch 72. The user control 74 in this example comprises a slide that pivots the lever 80.

In order to provide the disabling function, the locking mechanism 70 is coupled to latch operating device 62 and is operable to selectively prevent the latch operating device 62 from operating the latch 56, and in particular from actuating the latch 56 to its non-latching state. In the illustrated embodiment, the coupling is mechanical and comprises a rod 82, or other mechanical linkage, coupled between the latch control 74 and the latch operating device 62 in order to, depending on the operation of the latch control 74, actuates the latch operating device 62 into and out of a disabled state (shown in FIG. 6B) in which is unable to operate the latch 56. In this example, in the disabled state, the operating device 62 has been moved to a position where it is no longer able to engage with the latch 56. To this end, the operating device 62 may be pivotably mounted on the base 32 for movement by the rod 82. Conveniently, the rod 82 is coupled to the latch operating device 76 so that the locking function and disabling function are effected simultaneously by the user control 74. As such, in the preferred embodiment, the arrangement is such that when the user control 74 is operated to actuate the latch 72 to its latching state, the operating device 62 is disabled, and when the user control 74 is operated to actuate the latch 72 to its non-latching state, the operating device 62 is not disabled. The latch control 74 and operating device 76 may collectively be referred to as a latch operating mechanism. In alternative embodiments the latch operating mechanism, and/or the latch 72, may take any other suitable forms, and may for example be electrically and/or wirelessly operated.

The latches 56, 72 and their respective pins 57, 73 are positioned so that the respective latching states can both be adopted when the door 34 is in its open state. The latches 56, 72 are spaced apart in the, in use, vertical direction and this allows the door 34 to be held stably. Either one or both of the latches 56, 72 may be configured such that they are biased, e.g. resiliently biased, to adopt their respective latching states. Either one or both of the latches 56, 72 may be of a type that automatically opens to receive and closes to retain the respective pin 57, 73 in response to relative movement between the pin 57, 73 and latch 56, 72 involving moving engagement of the pin 57, 73 with the latch 56, 72 from outside of the latch. Hence, with the latch 56, 72 closed and the door 34 out of the open state, movement of the door 34 into the closed state causes the pin 57, 73 to engage with the latch 56, 72 in response to which the latch 56, 72 opens and subsequently closes to retain the pin 57, 73. In preferred embodiments, the latch 56 is of this type, i.e. a latch that is biased to adopt its latching state but is opened by engagement with the moving pin 57. Therefore when the passenger releases the latch control 58, the latch 56 adopts its latching state even if the door has been closed. In preferred embodiments, the latch 72 and associated operating mechanism are configured such at the latch 72 is opened (non-latching state) and closed (latching state) by the latch control 74 and remains in whichever state it is in until transitioned to the other by the control 74.

In use, when the door 34 is held in its open state by latch 56, if the other latch 72 is in its non-latching state, the seated passenger can open the latch 56 using control 58 thereby unlatching the door 34 to allow it to move. In the illustrated embodiment, once the door 34 is unlatched, it is moved by the actuation means 50 to its closed state, although movement to the closed state may also or alternatively be effected manually. However, if the locking device 70 has been set to the locking state so that the other latch 72 is in its latching state, then the door 34 is still held in its open state, by latch 72, even if latch 56 is open. In the preferred embodiment, however, latch 56 is disabled when the locking device 70 is in the locking state and so the latch 56 remains in its latching state, i.e. the door 34 is held open by both latches. To move the door 34 from the open state to the closed state, the passenger (or other person) can push the door 34 rearwards until the pins 57, 73 engage with the latches 56, 72. In the preferred embodiment, latch 56 automatically latches its pin 57 when the door 34 reaches the open state. It is preferred however that the latch 72 does not adopt its latching state until the locking device 70 is operated to the locking state. Typically, the locking device 70 is used by cabin crew, or the like, to keep the door 34 open during taxi, take-off and landing (TTL).

When the door 34 is closed, the primary means of egress for a seated passenger is to push the door 34 into the open state as described above, which preferred embodiments involves sliding the door 34 rearwards. For reasons of safety, the seating 10, and in particular the door assembly 30, provides, in addition to the primary means, a secondary means for a seated passenger to egress from the seat 12 when the door 34 is closed. The secondary means is preferably provided by configuring the door assembly 30, and in particular the door 34, to support a secondary mode of operation that is in addition to and different from, the primary mode of operation described above.

In preferred embodiments, and as is best illustrated in FIGS. 2A to 2E, the secondary opening mode is supported by providing the door 34 in first and second parts 34A, 34B that are coupled together, preferably pivotably, at joint 84. Joint 84 extends substantially vertically in use, i.e. is substantially perpendicular to the direction of movement of the door 34 between the open and closed states (which may also be referred to as the fore-and-aft direction), and substantially perpendicular to the rows R1, R2 (which may be referred to as the transverse direction). The joint 84 extends along the whole height of the door 34. The arrangement is such that, when the door 34 is in its closed state (as shown for example in FIGS. 2A and 2B) the joint 84 and the first part 34A of the door are exposed by the base 32, i.e. are outside of the compartment in the preferred embodiment. In this state, the second part 34B of the door is typically at least partly located within or in register with the base 32. Accordingly, when the door 34 is closed, the joint 84 allows its first part 34A to be moved with respect to the second part 34B to provide a second mode of opening the door.

Figure 2E:
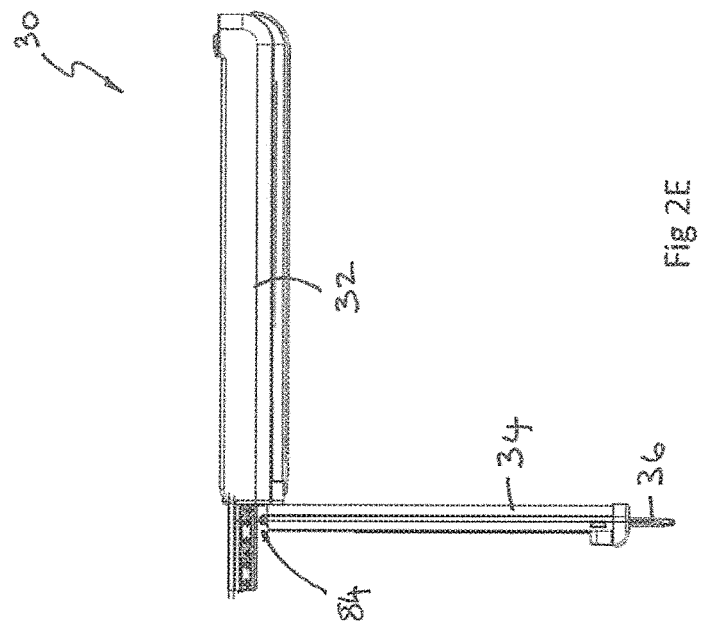
FIG. 2E is a plan view of the door assembly of FIG. 2A shown in the open state.
Figure 2D:
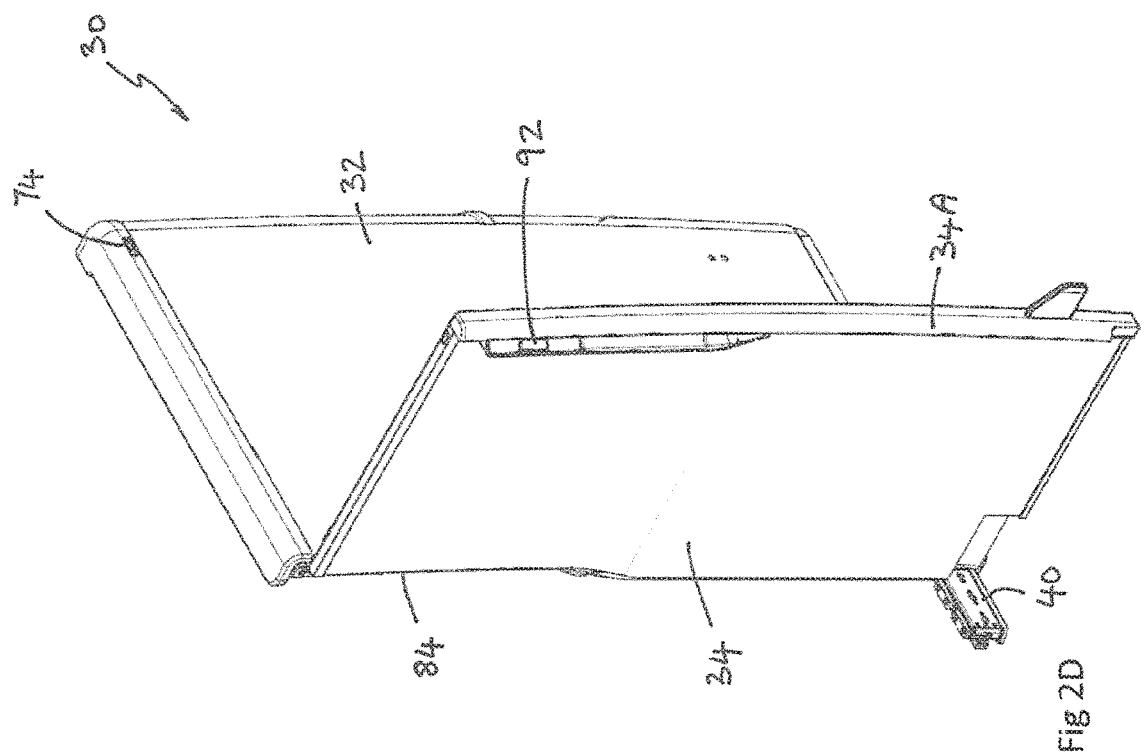
FIG. 2D is an outside perspective view of the door assembly of FIG. 2A shown in the open state.

In preferred embodiments, the first part 34A of the door is pivotably coupled to the second part 34A at the joint 84 to allow to first part 34A to pivot with respect to the second part 34B and with respect to the base 32, as shown in FIGS. 2C to 2E. The pivotable coupling may be provided by one or more hinges 86. The or each hinge 86 is preferably located at or near the middle of the door 34 (in the vertical direction). One or more return mechanism 88 is preferably provided to urge the first part 34A of the door to adopt its non-pivoted position (i.e. as shown in FIGS. 2A and 2B). In preferred embodiments, the pivotable coupling is configured so that the first part 34A of the door can pivot outwardly away from the seat 12, i.e. into the aisle. Hence, in preferred embodiments, when the door 34 is in its closed state as shown in FIGS. 2A and 2B, it is capable of being opened to allow egress from the seat 12 by either of two modes: sliding rearwardly to the open state; or pivoting outwardly in the manner of a hinged door.

In alternative embodiments (not illustrated), instead of or in addition to the pivotable coupling, one or more frangible devices, e.g. frangible pins, may be provided to couple the first and second parts 34A, 34B of the door 34 together at the joint 84. In use, the frangible devices prevent relative movement between the first and second door parts until they are broken by the application of force on the first part 34A of the door, e.g. by the seated passenger, which detaches the first part 34A from the door assembly 30 if no other coupling is present, or allows the first part 34A to be pivoted if the pivotable coupling is present. Either way, the passenger is able to egress.

It is preferable that the passenger does not use the second mode for opening the door 34 routinely; instead, the second mode is intended for use in emergencies. This may be encouraged by the provision of one or more frangible devices as described above. In preferred embodiments however, the door 34, in particular the first part 34, is provided with the latching formation 36, which is engagable with the corresponding latching formation 38 provided on the forward shell structure 14/bulkhead when the door 34 is in its closed state. The latching formations 36, 38 are parts of the first latch 35. Preferably, the latching formation 36 on the door 34 comprises a projection and the corresponding formation 38 on the forward shell/bulkhead comprises a corresponding socket for receiving the projection. Alternatively, the projection may be provided on the forward shell/bulkhead and the socket may be provided on the door 34. In either case the latch 35 is configured such that the formations can engage and disengage by movement of the door 34 in the fore-and-aft direction, i.e. the direction in which it moves in the primary mode, but when engaged prevent movement in the transverse direction. Therefore, when the latch 35 is in its latching state, i.e. the formations 36, 38 are engaged (see FIG. 3), the first part 34A of the door is not able to pivot about the joint 84 and so the passenger is not above to open the door 34 using the secondary mode. However, the latch 35, whether engaged or not, does not prevent the door 34 from being moved to its open state by the primary mode, i.e. from sliding rearwardly. In alternative embodiments (not illustrated), the first latch may be configured differently to perform the function of preventing the first part of the door from moving with respect to, or being separated from, the second part, i.e. preventing the door from opening in the second mode but allowing operation in the primary mode. For example the latch may be configured such that it extends across the joint 84 in its latching state but not in its non-latching state.

With reference in particular to FIGS. 4,4A and 5, an operating mechanism 90 for operating the first latch 35 between its latching and non-latching states is provided. In the preferred embodiments, especially where the formation 36 is a projection, the operating mechanism 90 is provided on the door 34. Alternatively, especially where the projection formation is provided on the forward shell/bulkhead, the operating mechanism may be provided on the forward shell/bulkhead. In any event, the operating mechanism 90 includes a latch control 92. The latch 35 is operable by a passenger and to this end the latch control 92 preferably provided on the inside face (i.e. passenger side), or top, of the door assembly 30, typically of the first part 34A of the door. In the illustrated embodiment, the latch 35 is operated mechanically by a cable 94, or other mechanical linkage, that couples the latch control 92 to a latch operating device 96. The latch operating device 96 is coupled to the latch projection 36 and, depending on the operation of the latch control 92, actuates the latch 35 between its latching and non-latching states by causing the projection 36 to extend or retract, respectively, in the fore-and-aft direction. In the illustrated embodiment, the operating device 96 comprises one or more springs 97 that urge the projection 36 to its extended state. The latch control 92, linkage 94 and operating device 96 may collectively be referred to as a latch operating mechanism. In alternative embodiments the latch operating mechanism, and/or the latch 35, may take any other suitable forms, and may for example be electrically and/or wirelessly operated.

The latch control 92 in this example comprises a slide coupled to the cable 94. In preferred embodiments, the latch 35 and associated operating mechanism are configured such at the latch 35 is opened (non-latching state) and closed (latching state) by the latch control 92 and remains in whichever state it is in until transitioned to the other state by the control 92.

Advantageously, an indicating device 98 for indicating the status of the latch 35, i.e. whether the latch 35 is in its latching or unlatching state. The indicating device 98 is preferably located such that it is clearly visible by a person, e.g. a member of the cabin crew, in the aisle. For example, the indicating device 98 may be located on the outside face of, or at the top of, the door assembly 30. In preferred embodiments, the indicating device 98 is coupled to the latch operating mechanism 90 so that operation of the latch operating mechanism 90 causes operation of the indicating device corresponding to the resulting operation of the latch 35. In the illustrated embodiment, the indicating device 98 is mechanically coupled to the operating mechanism 90, conveniently to the control 92, by a rod 99 or other mechanical linkage. The indicating device 98 may comprise a mechanical flag that is movable by the mechanical coupling with the operating mechanism 90 between first and second states that are indicative of the state of the latch 35. In the illustrated example, the indicating device 98 comprises a mechanical flag that, in its first state, is recessed within the door 34 (FIG. 4A), and in its second state projects out of the door (FIG. 5), and is therefore clearly visible. The rod 99 couples the device 98 to the latch control 92 such that the device 98 moves between its first and second states as the latch control 92 is moved to operate the latch 35 between its latched and non-latching states. In alternative embodiments, the indicating device 98 and/or its coupling with the operating mechanism 90 may take any other convenient conventional form, e.g. comprising electrical and/or wireless components.

In preferred embodiments, a second control for the latch 35 is provided, which is intended for use by a user other than the seated passenger, e.g. a member of the cabin crew. As such, the second control is preferably located on the outside face of, or at the top of, the door assembly 30. The second control may be coupled to the operating mechanism 90 in any convenient manner for operating the latch 35. In preferred embodiments, the indicating device 98 serves as the second control for the latch 35. In the illustrated embodiment, when the indicating device is raised in its second state (FIG. 5) it may be pushed down into its first state by a user, thereby moving the control 92 and actuating the latch 35 into its latched state. In this example the indicating device is not used to actuate the latch 35 from the latched state to the non-latched state, although in other embodiments the configuration may be such as to allow this.

In use, a member of the cabin crew, or the like, can tell from the indicating device 98 if the latch 35 is in the non-latching state (which is not desired in normal circumstances) and is therefore able to engage the latch 35, conveniently using the indicating device itself.

Referring now in particular to FIGS. 8 to 18B, in preferred embodiments the door assembly 30 is movable between a normal state (shown for example in FIGS. 8 and 9) and a access state (shown for example in FIG. 16). The normal state corresponds to the state in which the door 34 is operable in the manner described above with reference to and as illustrated in FIGS. 1 to 7B and below in relation to FIGS. 19 to 21. As such, in the normal state, the base portion 32 of the door assembly 30 extends along the aisle-side of the seat 12 typically from the back 16 of the shell 14, and is positioned in the fore-and-aft direction such that the door 34 can be closed to close the gap 24, as described above. However, in the normal state, even with the door 34 open there may be insufficient room for a person with restricted mobility to manoeuvre or be maneuvered into or out of the seat 12 through the gap 24. Therefore, in the access state, the door assembly 30, including both the base 32 and the door 34, adopts a position that is rearward and/or outward of the position that it adopts in the normal state. This increases the size of the gap available for a passenger to be seated or unseated.

In the preferred embodiment, the door assembly 30 pivotably coupled to the shell structure 14 preferably at least one pivotable linkage 103. The illustrated linkage 103 has first and second links 105, 107, each being pivotably coupled to the shell structure 14 and to the door assembly 30 (conveniently to the base 32). The links 105, 107 are preferably parallel creating a parallel linkage 103. The respective pivot axis of each coupling is substantially in the vertical direction so that the linkage 103 allows movement of the door assembly 30 in the fore-and-aft direction. The preferred linkage 103 causes the door assembly 30 to move in an arc such that it moves outwardly away from the seat 12 as it moves rearwardly from the normal position, as can best be seen from FIG. 15, and vice versa. In the illustrated example, two vertically spaced linkages 103 are provided in register with one another, although more or fewer may alternatively be provided. Alternative linkages may be used, for example having more or fewer links. Alternatively still, the door assembly 30 may be hingedly mounted on the shell structure 14, for example adjacent the back 16, to allow it to pivot outwardly away from the seat 12, preferably about a substantially vertical axis. However, a parallel linkage is preferred as it keeps the door assembly relatively close to the shell 14 which minimizes obstruction in the aisle and does not require the aisle to be particularly wide.

Advantageously, the door assembly 30 is detachable from the linkage 103 to allow it to be disassembled from the shell structure 14, conveniently by being lifted upwardly. This may be achieved by providing vertically orientated pin-and-socket coupling between the links 105, 107 and the door assembly as can best be seen in FIG. 17 or between the linkage and the shell structure.

FIGS. 18A and 18B show an alternative mechanism for coupling the door assembly 30 to the shell structure 14 to provide movement between the normal and access states. In this embodiment, the coupling mechanism comprises a sliding mechanism 109 that allows the door assembly to slide in the fore-and aft direction with respect to the seat 12. The slide mechanism 109 may comprise any configuration of rails, rollers and/or other components to facilitate the sliding movement. Preferably, the door assembly 30 is detachable from the slide mechanism to allow it to be disassembled from the shell structure 14. The pivotable linkage 103 is preferred over the slide mechanism 109 since there may be little or no room for the door assembly 30 to move directly rearwards depending on for example whether or not there is a bulkhead directly behind the seat.

Figure 11:
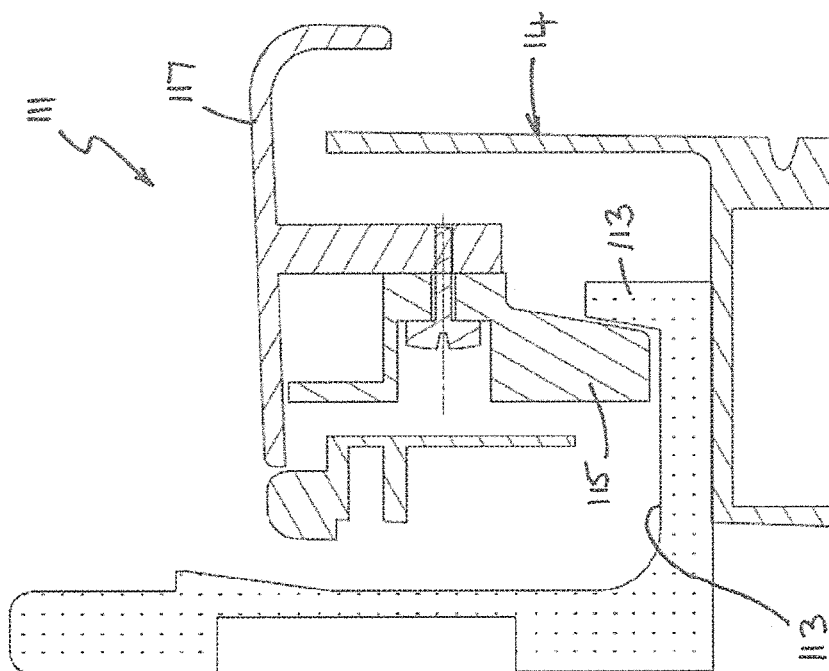
FIG. 11 is an end section view of the door assembly release mechanism in the non-releasing state.
Figure 10:
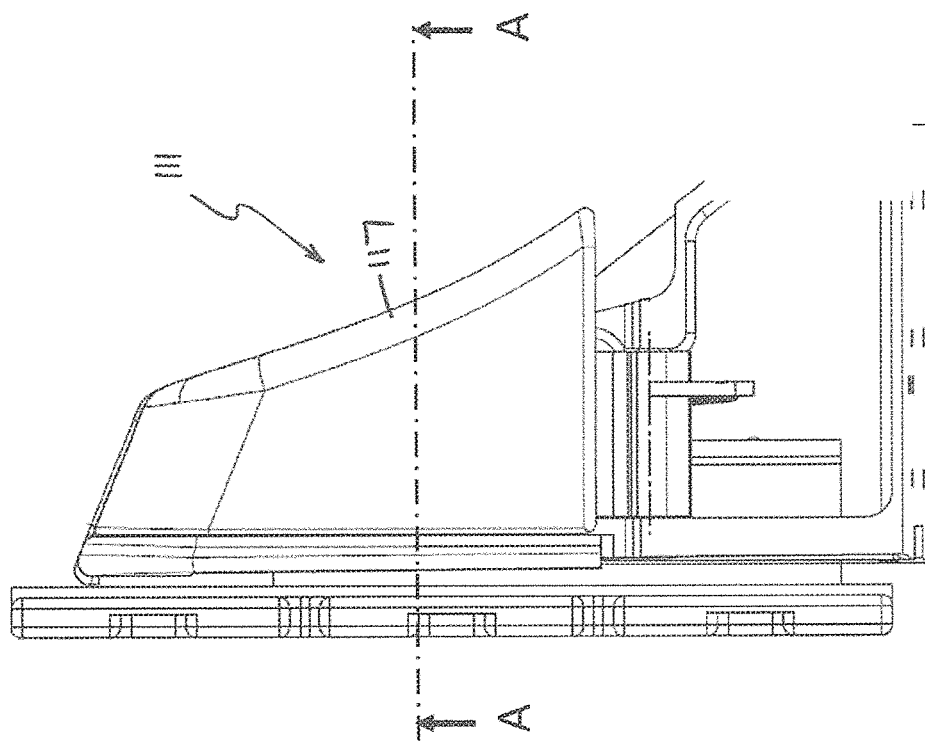
FIG. 10 is a plan view of the door assembly release mechanism in the non-releasing state.

In preferred embodiments, a door assembly release mechanism, conveniently comprising a clamp 111, is provided for releasably clamping the door assembly 30 in its normal state. In particular the clamp 111 is operable into and out of a clamping state in which it holds the door assembly 30 in a fixed position with respect to the shell structure 14. When released, i.e. out of the clamping state, the clamp 111 allows the door assembly 30 to move between its normal state and its access state. An embodiment of the clamp 111 is shown in FIGS. 10 and 11 and can be seen in situ in FIGS. 9 and 9A. In the illustrated embodiment, the clamp 111 is provided on the shell structure 14 and a cooperable flange 113 is provided on the door assembly 30, although these positions could alternatively be reversed. When the door assembly is in its normal state, the flange 113 is located in the clamp 111 such that, when the clamp is in its clamping state (FIG. 11), a jaw 115 of the clamp 111 retains the flange 113 thereby clamping the door assembly 30 to the shell structure 14. The clamp 111 is preferably manually operable, for example by a lever 117 or other user control. Preferably, when the clamp 111 is not in its clamping state, the lever 117 projects upwardly (FIG. 9) preferably such that it is visible above the level of the door assembly and shell structure 14. As such the cabin crew are alerted to any unintentionally or in appropriately disengaged clamps. Advantageously, at least part of the lever 117 is coloured in a high visibility manner, e.g. coloured red, to increase its visibility. Preferably part of the lever 117 that is visible only when the lever 117 is in the non-clamping position (i.e. projecting upwards in this example) is so coloured, for example the underside 117A of the lever 117.

Figure 13:
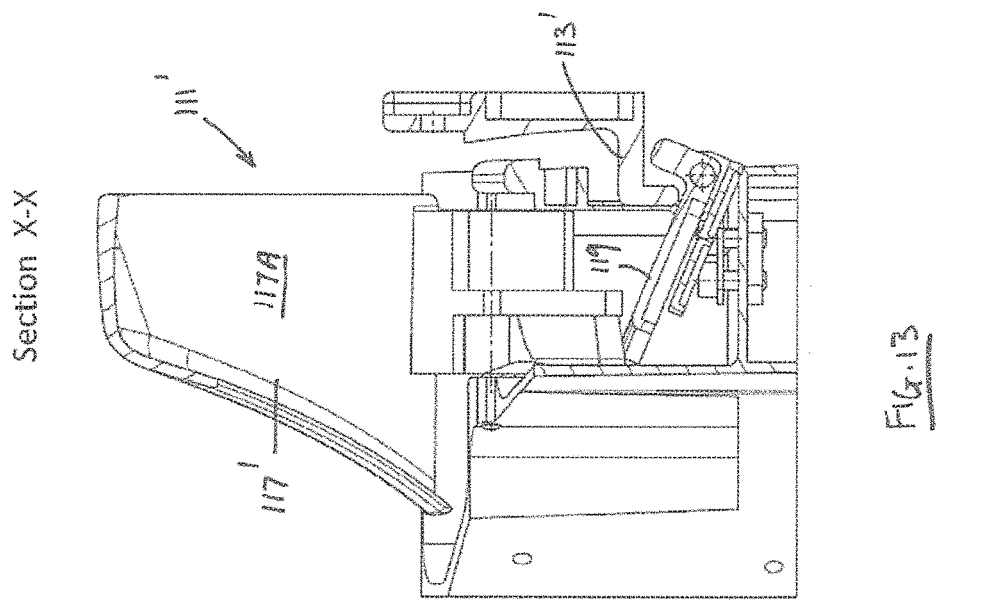
FIG. 13 is an end section view of the alternative door assembly release mechanism in the releasing state.
Figure 14:
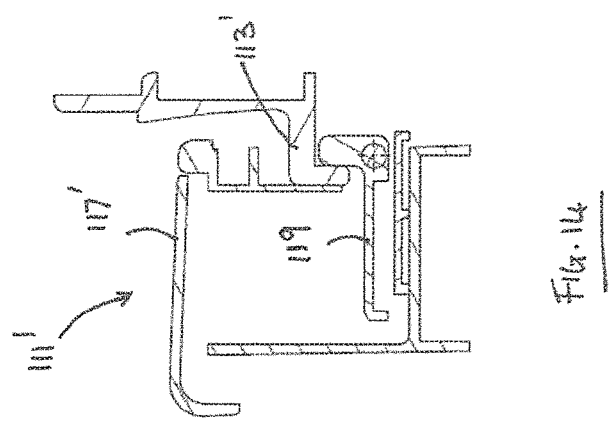
FIG. 14 is an end section view of the alternative door assembly release mechanism in the non-releasing state.
Figure 12:
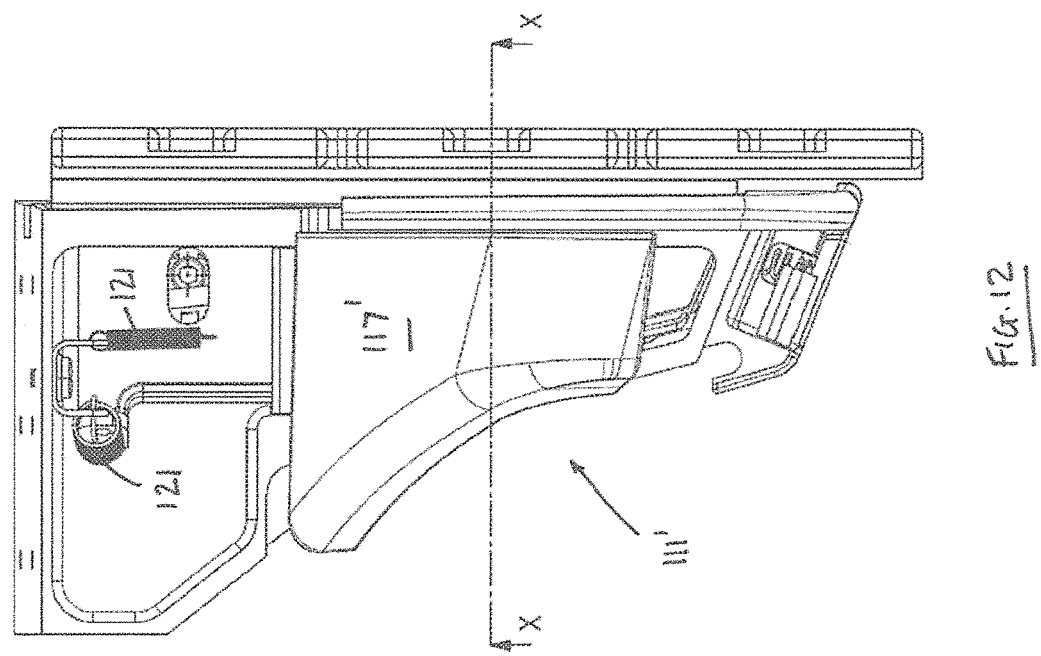
FIG. 12 is a plan view of an alternative embodiment of the door assembly release mechanism in the releasing state.
Figure 15:
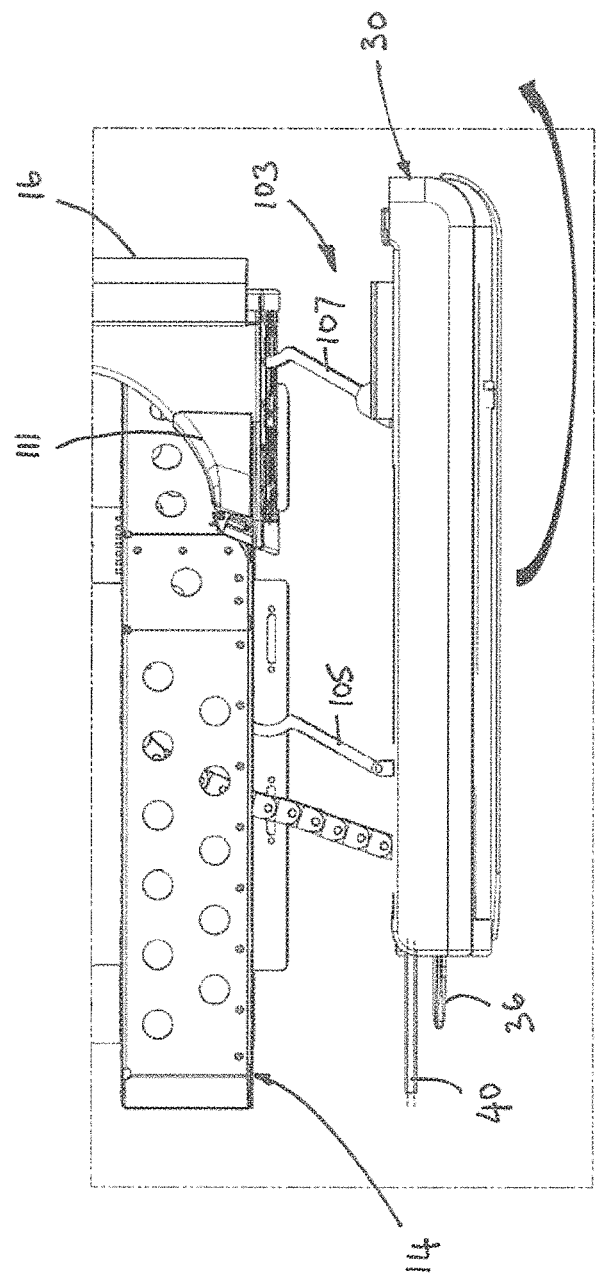
FIG. 15 is a plan view of part of the seating of FIG. 1, with the door assembly shown in an access state.
Figure 18:
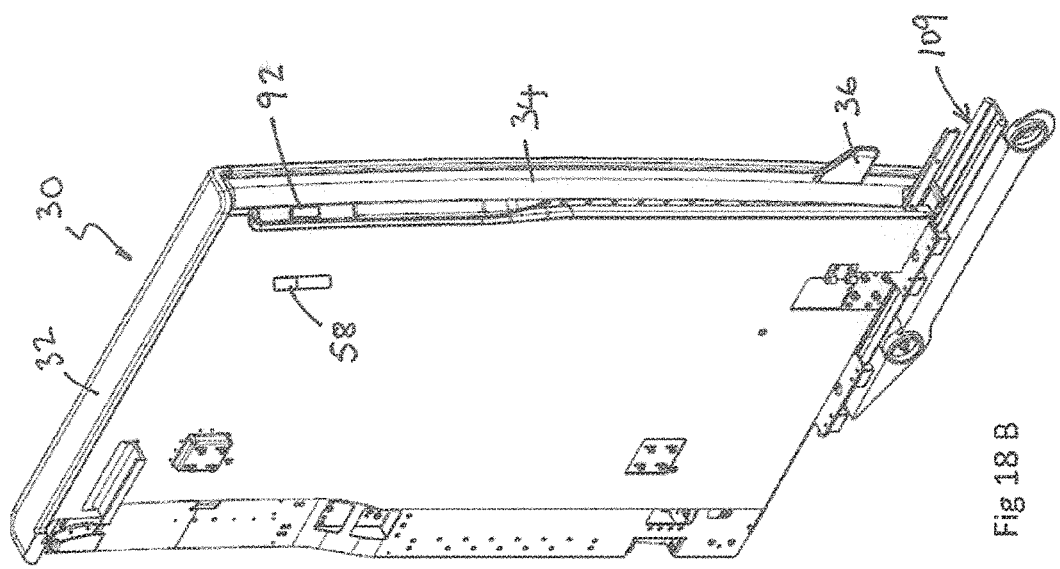
FIG. 18A is a perspective view of an alternative embodiment of the door assembly shown in a normal advanced state.
FIG. 18B is a perspective view of the alternative embodiment of the door assembly shown in an access state.
Figure 18:
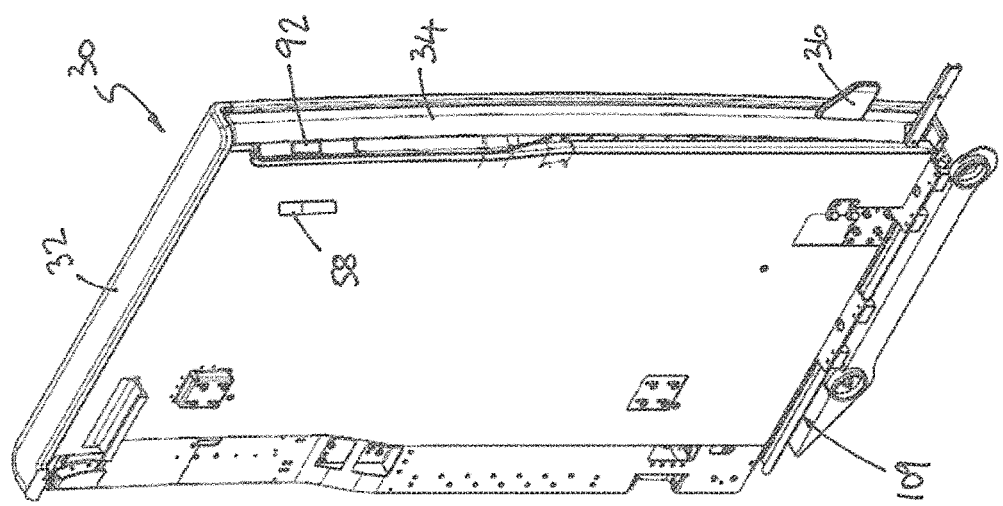

FIGS. 12 to 14 show an alternative embodiment of a clamp 111', which is similar to clamp 111 and the same or similar description applies except as indicated. The clamp 111' includes a pivotable lever 119 that is pivotable into and out of a clamping state in which it clamps the flange 113' (as shown in FIG. 14). The lever 119 is pivoted into and held in its clamping state by the lever 117'. The lever 119 may be resiliently biased to move out of its clamping state, e.g. by springs 121.

In any event, the clamp 111, 111' is operable to clamp the door assembly 30 to, or release it from, the shell structure 14 in order to prevent or allow, respectively, the door assembly 30 to be moved between its normal and access states.

In preferred embodiments, each door assembly 30 is provided with more than one door assembly release mechanism for releasably clamping the door assembly 30 in its normal state, and when released, i.e. out of a clamping state, allowing the door assembly 30 to move between its normal state and its access state. FIGS. 22A and 22B show an example of a further door assembly release mechanism 33, which is preferably used in addition to the clamp 111, 111' but which may alternatively be used instead of the clamp 111, 111' or with one or more other release mechanisms. The door assembly release mechanism 33 comprises a clamp 135 that is operable into and out of a clamping state (shown in FIG. 22B) in which it holds the door assembly 30 in a fixed position with respect to the shell structure 14/seat 12. In preferred embodiments, when released (FIG. 22A), i.e. out of the clamping state, the clamp 135 allows the door assembly 30 to move between its normal state and its access state. It is preferred that the clamp 135 is located at an in use lower portion of the door assembly 30, for example at a lower support structure 37 which may be provided along a lower end of the door assembly 30. In this example, the clamp 135 comprises first and second inter-engagable clamping components in the preferred form of a socket 135A and a removable clamping pin 135B. An aperture 39 is formed in the support structure (or other relevant portion of the door assembly 30) through which the pin 135B can be inserted. The socket 135A is provided in a fixed position with respect to the seating 10, e.g. fixed to the shell 14, or seat support (not shown) or floor. In the clamping state, the pin 135B is inserted through the support structure (or other relevant portion of the door assembly 30) and into the socket 135B thereby clamping the door assembly 30 in a fixed position with respect to the seat 12. In the non-clamping state, the clamp 135 does not prevent movement between the door assembly and the seat/shell. This allows movement into and out of the access state in the preferred embodiment. In other embodiments, it may allow removal (i.e. detachment) of the door assembly altogether depending on which part of the door assembly it interacts with. More than one such clamp 135 may be provided. For example, in FIG. 22A, the support structure 37 has a second aperture 39' for receiving a second clamping pin (not shown). Advantageously, the arrangement is such that the clamping pin 135B is insertable and removable from the outside of the door assembly, i.e. the opposite side to the seat 12, so that it is readily operable by, for example, cabin crew rather than a seated passenger.

Figure 23A:
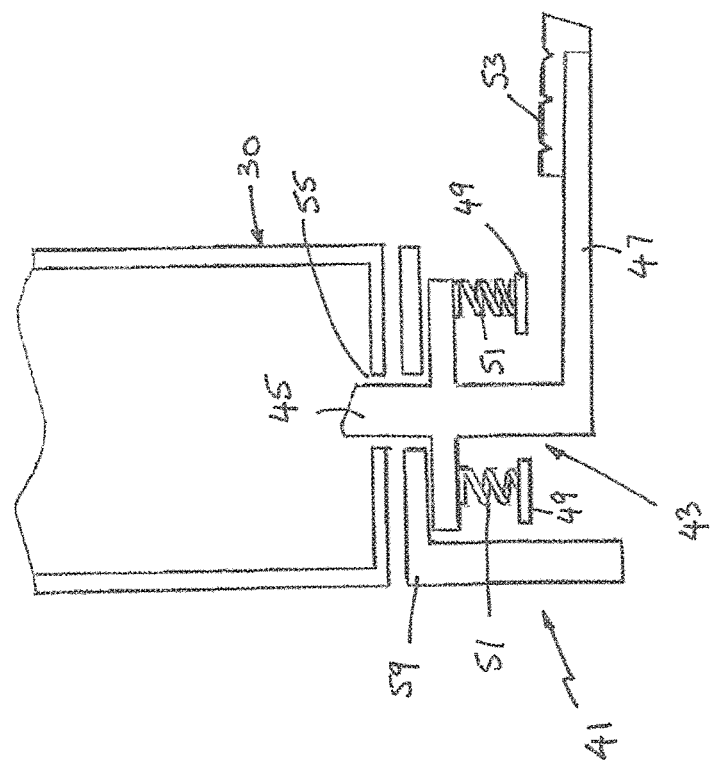
FIG. 23A is a perspective view of a locking mechanism shown in a locking state.
Figure 23B:
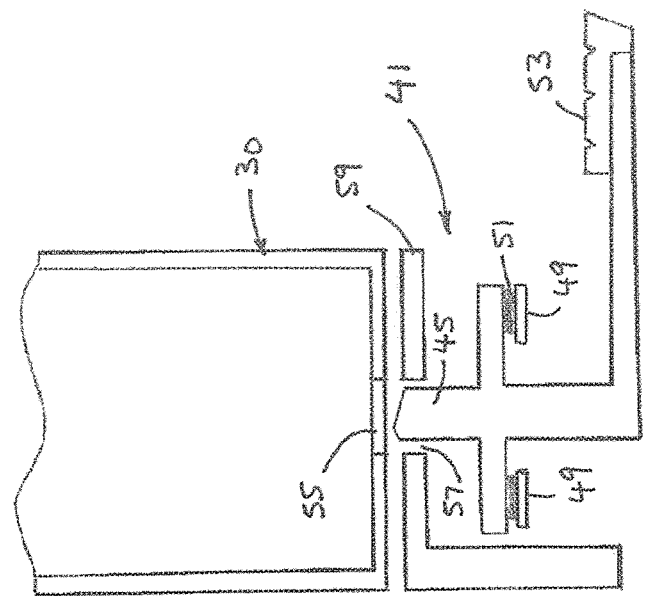
FIG. 23B is a perspective view of the locking mechanism shown in a non-locking state.

Referring now to FIGS. 23A and 23B, optionally a locking mechanism 41 is provided for releasably locking the door assembly 30 in its normal state, and when released, i.e. out of a locking state, allowing the door assembly 30 to move between its normal state and its access state. The locking mechanism 41 may be used in addition to any one or more of the door assembly release mechanism(s) 111, 111', 135, but which may alternatively be used instead of the clamps or with one or more other release mechanisms. The locking mechanism 41 comprises a locking pin assembly 43 that is operable into and out of a locking state (shown in FIG. 23A) in which it holds the door assembly 30 in a fixed position with respect to the shell structure 14/seat 12. In preferred embodiments, when released (FIG. 23B), i.e. out of the locking state, the locking pin assembly 43 allows the door assembly 30 to move between its normal state and its access state. The locking pin assembly 43 has a locking pin 45 connected to an operating device 47 and movably coupled to a support structure 49. The locking pin 45 is movable between an extended position (FIG. 23A) and a retracted position (23B) with respect to the support 49, Preferably resilient biasing means, for example comprising one or more springs 51, are provided to urge the locking pin 45 into its extended position. The operating device 47, which preferably comprises a pedal 53 but which could alternatively comprise any other suitable device such as a handle or lever, is operable to move the pin 45 between its extended and retracted states (which correspond to the locking an unlocked states of the mechanism 41). In the illustrated example, depressing the pedal 53 retracts the pin 45 against the bias of the springs 51 while releasing the pedal 53 causes the pin 45 to extend under the resilient bias. A socket 55 for receiving the pin 45 is provided in the door assembly 30. The support structure 49 is fixed with respect to the seating 10, e.g. fixed to the shell 14, or seat support (not shown) or floor. Hence, in the locking state the pin 45 prevents movement of the door assembly 30 with respect to the seat, preferably out of the normal state. In the illustrated embodiment, an aperture 57 is provided in an intermediate structure 59 aligned with the socket 55 such that in the locking state, the pin 45 is extended through the aperture 57 and into the socket 55. The intermediate structure 59 may be part of the support structure 49 and/or may be any other suitable component of the seating 10. It is preferred that the locking mechanism 41 is located at an in use lower portion of the door assembly 30, for example beneath and engagable with a lower end of the base 32, in which case the socket 55 may be formed in the lower end of the base 32. Advantageously, the arrangement is such that the operating device 47, in particular the pedal 53, is user-operable from the outside of the door assembly, i.e. the opposite side to the seat 12, so that it is readily operable by, for example, cabin crew rather than a seated passenger.

Figures 19A, 19B:
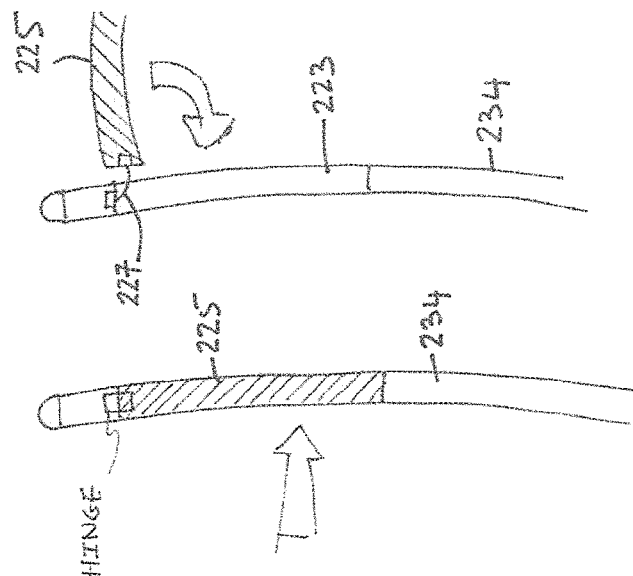
FIG. 19A is a side view of a door included in the door assembly of FIG. 19, the door being shown with an escape hatch in a closed state.
FIG. 19B is a side view of a door included in the door assembly of FIG. 19, the door being shown with an escape hatch in an open state.
Figure 19:
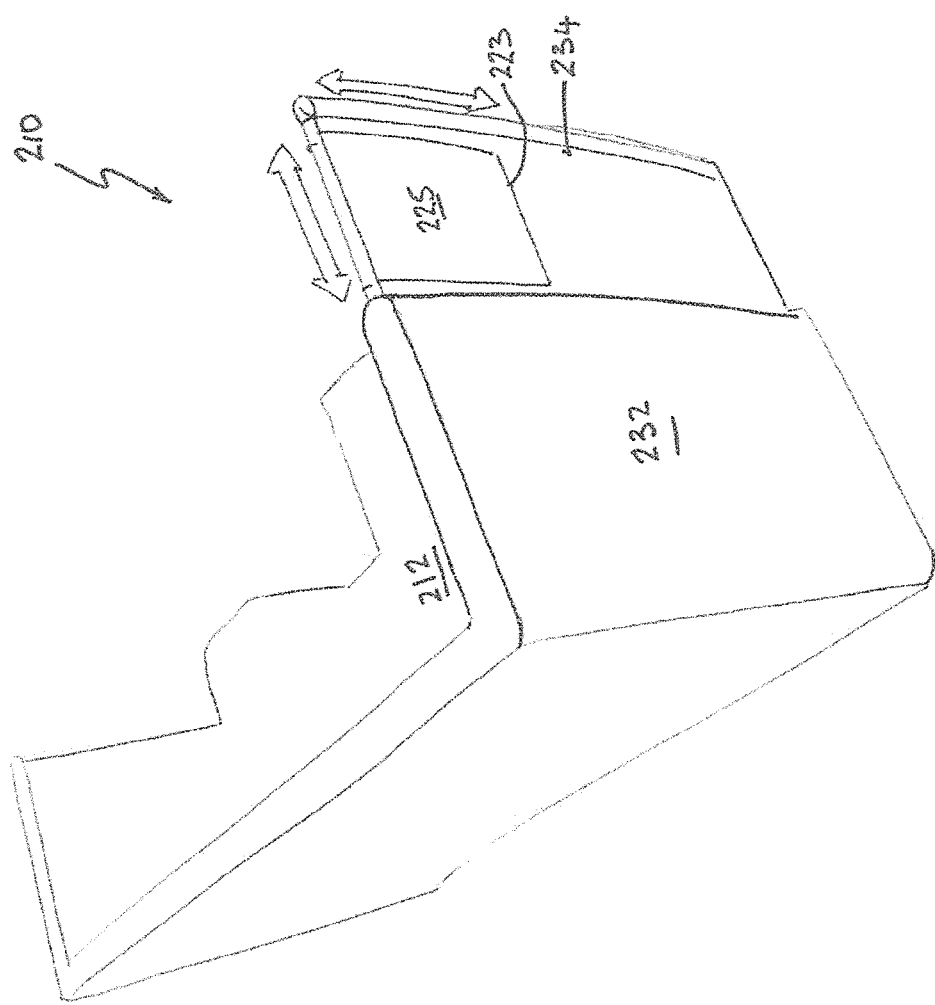
FIG. 19 is a perspective view of passenger seating with an alternative embodiment of a door assembly.

FIGS. 19, 19A and 19B show alternative passenger seating 210 in respect of which like numerals are used to denote like parts and the same or similar description applies as provided above unless otherwise indicated. In this embodiment, the secondary opening mode is supported by providing the door 234 with a hatchway 223 that is exposed from the base 232 when the door 234 is in its closed state and is large enough for a person to pass through. The hatchway 223 is normally closed by a hatch 225. The hatch 225 is capable of being opened to expose the hatchway 223. For example, the hatch 225 may be pivotably coupled to the door 334, conveniently at one of its edges, and preferably such that it can pivot outwardly towards the aisle. One or more hinges 227 may be provided for this purpose. The hinge(s) 227 or other pivotable coupling may be provided at the top of the hatch 223 so that the hatch 223 adopts a closed state under the influence of gravity.

FIGS. 20, 20A and 20B show alternative passenger seating 310 in respect of which like numerals are used to denote like parts and the same or similar description applies as provided above unless otherwise indicated. In this embodiment, the secondary opening mode is supported by providing the door 334 with a hatchway 323 that is exposed from the base 332 when the door 334 is in its closed state and is large enough for a person to pass through. The hatchway 323 is normally closed by a hatch 325. The hatch 325 is capable of being opened to expose the hatchway 323. In this example, the hatch 325 is slidable between open and closed states, the door 334 preferably including a compartment 329 into which the hatch 325 slides to open the hatchway 323. The hatch 325 may be coupled to the hatchway 323 by any conventional slide mechanism (not shown).

Figure 21B:
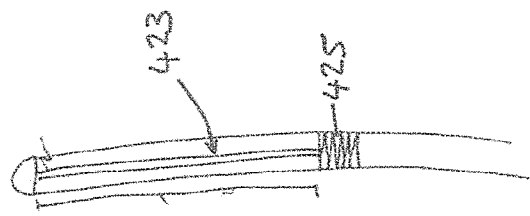
FIG. 21B is a side view of a door included in the door assembly of FIG. 21, the door being shown with an escape hatch in an open state.
Figure 21A:
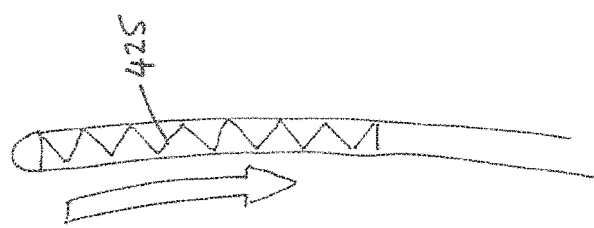
FIG. 21A is a side view of a door included in the door assembly of FIG. 21, the door being shown with an escape hatch in a closed state.
Figure 21:
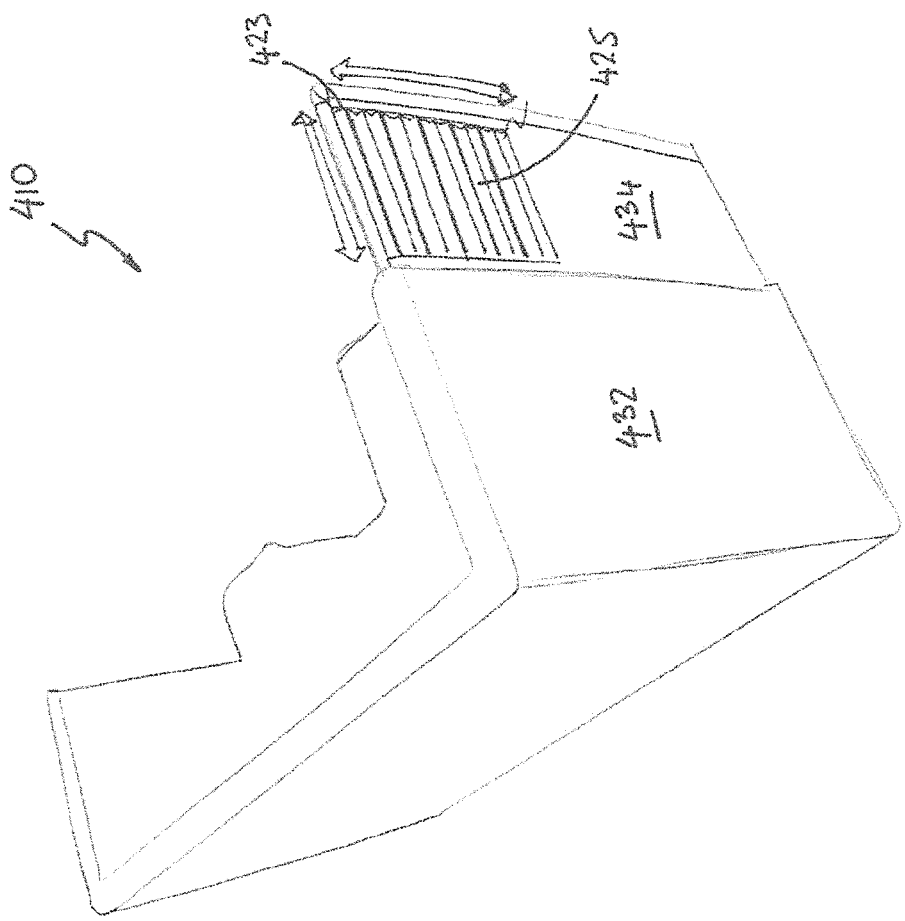
FIG. 21 is a perspective view of passenger seating with another alternative embodiment of a door assembly.

FIGS. 21, 21A and 21B show alternative passenger seating 410 in respect of which like numerals are used to denote like parts and the same or similar description applies as provided above unless otherwise indicated. In this embodiment, the secondary opening mode is supported by providing the door 434 with a hatchway 423 that is exposed from the base 432 when the door 434 is in its closed state and is large enough for a person to pass through. The hatchway 423 is normally closed by a hatch 425. The hatch 425 is capable of being opened to expose the hatchway 423. In this example, the hatch 425 is a blind that is deployable to cover the hatchway 423 and which may be opened to expose the hatchway 423. By way of example, the blind may be formed from foldable fabric. Any conventional user operable blind deployment mechanism may be installed in or around the hatchway as is convenient.

In other embodiments (not illustrated) alternative means for closing the hatchway may be provided. For example the hatch, or cover, may be formed from a frangible material, for example paper or film, that may be readily and safely broken by the passenger in the event of an emergency. Optionally, the hatch may be held in its closed state by one or more frangible devices, e.g. frangible pins, that may be broken by applying pressure on the hatch to remove the hatch and expose the hatchway. In any embodiment, a latch may be provided for performing the function of preventing the hatch moving with respect to, or being separated from, the door, i.e. preventing the door from opening in the second mode but allowing operation in the primary mode.

The invention is not limited to the embodiment(s) described herein but can be amended or modified without departing from the scope of the present invention.

The invention claimed is:

1. Passenger seating comprising at least one seat and a door assembly, said door assembly comprising a base portion and a door, said door assembly being operable in a primary mode in which said door is movable with respect to the base portion between an open state in which a gap is defined to provide access to said at least one seat, and a closed state in which said door closes said gap, and
wherein said base portion and said door are movable with respect to said seat between a normal state and an access state, said gap being wider in said access state than in a normal state and an access state,
and wherein said gap has a width and, when said base portion and said door are in said access state and said door is in the open state, the width of said gap is greater than the width of said gap when said base portion and said door are in said normal state and said door is in the open state.

2. The passenger seating of claim 1, wherein said door is slidable with respect to the base portion between said open state and said closed state in said primary mode.

3. The passenger seating of claim 2, wherein said door is slidable in a first axial direction between said open state and said closed state, and wherein said base portion and said door are movable in said first axial direction between said access state and said normal state.

4. The passenger seating of claim 1, wherein said base portion and said door are movable away from said seat when moving from said normal state to said access state.

5. The passenger seating of claim 1, wherein said base portion and said door are movable rearwardly and/or outwardly with respect to said seat when moving from said normal state to said access state.

6. The passenger seating of claim 1, wherein said base portion and said door are pivotable with respect to said seat between said normal state and said access state by means of at least one pivotable linkage.

7. The passenger seating of claim 1, wherein said base portion and said door are slidable with respect to said seat between said normal state and said access state by means of at least one sliding mechanism.

8. The passenger seating of claim 1, wherein said door is configured to support a second mode of opening out of said closed state that is different from said primary mode, and which is independent of movement of said door and base portion between said normal state and said access state.

9. The passenger seating of claim 8, wherein said door is configured to support a second mode of opening out of said closed state that is different from said primary mode, said door being configured to support said second mode by being shaped to define a hatchway that is exposed from the base portion when the door is in the closed state and is dimensioned to allow a person to pass therethrough, and further including means for closing said hatchway.

10. The passenger seating of claim 8, wherein said door is configured to support said second mode by being formed in first and second parts that are pivotably coupled together at a substantially vertical pivot joint that is exposed from said base portion when said door is in said closed state, said first and second parts being pivotable with respect to each other at said joint about a substantially vertical axis.

11. The passenger seating of claim 1, comprising a plurality of rows of at least one seat, the rows being spaced apart to define a gap between adjacent rows, wherein the respective door of the or each respective door assembly of at least one of said rows, when in said closed state, closes the gap between the respective row and the row in front.

12. The passenger seating of any claim 1, wherein said base portion is panel-like in shape and provides a wall that is part of a seat surround structure.

13. The passenger seating of claim 1, wherein said base portion includes a compartment for housing said door when in said open state.

14. The passenger seating of claim 1, wherein the, or each, door assembly further includes a first user-operable latch operable to selectively prevent the respective door opening a second mode that is different from said primary mode.

15. The passenger seating of claim 14, wherein said first user-operable latch is configured not to prevent operation of said door in said primary mode.

16. The passenger seating of claim 1, wherein the, or each, door assembly includes a second user operable latch mechanism that is operable to selectively retain the respective door in its open state, and wherein the or each door assembly includes a second latch operating mechanism including a user control for controlling operation of said second latch mechanism.

17. The passenger seating of claim 1, wherein the or each door assembly includes a locking mechanism for selectively locking the respective door in its open state, and wherein said locking mechanism includes a third user operable latch mechanism that is operable to selectively retain the respective door in its open state, and a respective latch operating mechanism including a user control for controlling operation of said third latch mechanism.

18. The passenger seating of claim 1 further including a door assembly release mechanism comprising a clamp that is operable into and out of a clamping state in which it holds the door assembly in a fixed position with respect to a shell structure and/or the respective seat.

19. Passenger seating comprising at least one seat and at least one respective door assembly, said door assembly comprising a base portion and a door that, in a primary mode of operation, is slidable with respect to the base portion between an open state and a closed state, and wherein said door is configured to support a second mode of opening out of said closed state that is different from said primary mode, said door being configured to support said second mode by being formed in first and second parts that are pivotably coupled together at a substantially vertical pivot joint that is exposed from said base portion when said door is in said closed state, said first and second parts being pivotable with respect to each other at said joint about a substantially vertical axis, and wherein the or each door assembly includes a locking mechanism for selectively locking the respective door in its open state, and wherein said locking mechanism includes a user operable latch mechanism that is operable to selectively retain the respective door in its open state, and a respective latch operating mechanism including a user control for controlling operation of said latch mechanism.

20. Passenger seating comprising at least one seat and at least one respective door assembly, said the respective door assembly comprising a base portion and a door that, in a primary mode of operation, is slidable with respect to the base portion between an open state and a closed state, wherein said door is configured to support a second mode of opening by being shaped to define a hatchway that is exposed from the base portion when the door is in the closed state and is dimensioned to allow a person to pass therethrough, the door further including means for closing said hatchway.

* * * * *